(12) United States Patent
Kato et al.

(10) Patent No.: US 12,029,983 B2
(45) Date of Patent: Jul. 9, 2024

(54) STORAGE MEDIUM, INFORMATION PROCESSING SYSTEM, INFORMATION PROCESSING APPARATUS, AND GAME PROCESSING METHOD

(71) Applicant: NINTENDO CO., LTD., Kyoto (JP)

(72) Inventors: Ken Kato, Kyoto (JP); Yoshifumi Masaki, Kyoto (JP)

(73) Assignee: Nintendo Co., Ltd., Kyoto (JP)

( * ) Notice: Subject to any disclaimer, the term of this patent is extended or adjusted under 35 U.S.C. 154(b) by 217 days.

(21) Appl. No.: 17/880,997

(22) Filed: Aug. 4, 2022

(65) Prior Publication Data
US 2023/0092388 A1   Mar. 23, 2023

(30) Foreign Application Priority Data
Sep. 22, 2021   (JP) ................. 2021-154373

(51) Int. Cl.
*A63F 13/63*   (2014.01)
*A63F 13/55*   (2014.01)

(52) U.S. Cl.
CPC .............. *A63F 13/63* (2014.09); *A63F 13/55* (2014.09)

(58) Field of Classification Search
None
See application file for complete search history.

(56) References Cited

U.S. PATENT DOCUMENTS

| | | | |
|---|---|---|---|
| 2007/0129148 A1* | 6/2007 | Van Luchene | G07F 17/32 463/1 |
| 2019/0138785 A1* | 5/2019 | Olsen | A63F 13/213 |
| 2020/0202627 A1* | 6/2020 | Kake | G06T 17/10 |
| 2021/0072981 A1 | 3/2021 | Duan | |

FOREIGN PATENT DOCUMENTS

| | | |
|---|---|---|
| JP | 2022-547870 | 11/2022 |
| WO | 2019/182826 | 9/2019 |
| WO | 2021/045792 | 3/2021 |

OTHER PUBLICATIONS

"Animal Crossing: New Horizons", Nintendo Co., Ltd., searched on Sep. 1, 2021, https://www.animal-crossing.com/new-horizons/create, 11 pages.

* cited by examiner

*Primary Examiner* — Jason T Yen
(74) *Attorney, Agent, or Firm* — Nixon & Vanderhye PC

(57) ABSTRACT

An example of an information processing apparatus performs, in a predetermined area (e.g., a room) in a virtual space, editing including at least one of selecting a placement object to be placed in the area, placing the placement object, and moving the placement object, on the basis of an operation input. The information processing apparatus counts an editing time during which the editing is performed. The information processing apparatus stores, in a memory, arrangement data indicating arrangement of the placement object in the predetermined area. The information processing apparatus performs evaluation of the editing, based on at least the editing time such that a lower evaluation is given when the editing time is shorter than when the editing time is longer.

40 Claims, 20 Drawing Sheets

STORAGE MEDIUM, INFORMATION PROCESSING SYSTEM, INFORMATION PROCESSING APPARATUS, AND GAME PROCESSING METHOD

CROSS REFERENCE TO RELATED APPLICATION

This application claims priority to Japanese Patent Application No. 2021-154373, filed on Sep. 22, 2021, the entire contents of which are incorporated herein by reference.

FIELD

The technique shown here relates to a storage medium having stored therein a game program, an information processing system, an information processing apparatus, and a game processing method, which allow a user to edit arrangement of objects in a virtual space.

BACKGROUND AND SUMMARY

Conventionally, there is a game in which a user is allowed to edit arrangement of objects in an area, in a virtual space, where the objects are arranged (e.g., a room where furniture articles are arranged).

It is desirable to appropriately evaluate the editing regarding the arrangement of the objects.

Therefore, the present application discloses a storage medium having stored therein a game program, an information processing system, an information processing apparatus, and a game processing method, which allow appropriate evaluation of editing regarding arrangement of objects.

(1) An example of a storage medium described in the present application has a game program stored therein. The game program causes a processor of an information processing apparatus to execute the following processes.

- Performing, in a predetermined area (e.g., a room) in a virtual space, editing including at least one of selecting a placement object to be placed in the area, placing the placement object, and moving the placement object, on the basis of an operation input.
- Counting an editing time during which the editing is performed.
- Storing, in a memory, arrangement data indicating arrangement of the placement object in the predetermined area.
- Performing evaluation of the editing, based on at least the editing time such that a lower evaluation is given when the editing time is shorter than when the editing time is longer.

According to the configuration of the above (1), since the editing time is reflected in the evaluation, evaluation of the editing can be appropriately performed.

(2) The game program may cause the processor to execute counting the editing time, based on a determination as to whether or not an input is performed in a period in which the editing is allowed.

According to the configuration of the above (2), since the time in which the user is actually performing the input can be reflected in the editing time, evaluation based on the editing time can be performed more accurately.

(3) The game program may further cause the processor to execute giving a reward according to the evaluation to a user who has performed the operation input.

According to the configuration of the above (3), motivation to get a high evaluation of the editing can be given to the user.

(4) The game program may further cause the processor to execute displaying a message from a non-player character in the virtual space such that the message has different contents according to the evaluation.

According to the configuration of the above (4), the user can be notified of the evaluation of the editing, through the message.

(5) The information processing apparatus may be communicable with a server. The game program may further cause the processor to execute: transmitting the arrangement data to the server; receiving, from the server, list data indicating a list regarding a plurality of arrangement data transmitted from other information processing apparatuses different from the information processing apparatus to the server; and performing list display regarding the plurality of arrangement data, based on the list data received from the server.

According to the configuration of the above (5), the list of the arrangement data edited by the other users can be presented to the user.

(6) The list display may relate to arrangement data that is selected based on the editing time from a set of arrangement data transmitted from a plurality of other information processing apparatuses.

According to the configuration of the above (6), the list of the arrangement data can be displayed taking into account the editing time.

(7) The list display may relate to the plurality of arrangement data obtained by deleting arrangement data whose evaluation based on editing time is lower than a predetermined reference, from the set of the arrangement data transmitted from a plurality of other information processing apparatuses.

According to the configuration of the above (7), the list regarding highly evaluated arrangement data can be presented to the user.

(8) The predetermined area may be a room in the virtual space. The placement object may be any of a plurality of types of objects including at least furniture.

According to the configuration of the above (8), evaluation of editing of a room, in the virtual space, in which furniture is arranged, can be appropriately performed.

(9) The game program may further cause the processor to execute: storing, in the memory, editing time data indicating the editing time such that the editing time data is included in the arrangement data; reading out the arrangement data stored in the memory, based on an instruction input to perform re-editing; and performing, based on an operation input, re-editing on arrangement of the placement object indicated by the read arrangement data. Evaluation of editing regarding the arrangement data on which the re-editing has been performed may be performed based on a time obtained by adding an editing time of the re-editing to the editing time indicated by the editing time data included in the arrangement data before the re-editing is performed.

According to the configuration of the above (9), when re-editing has been performed, evaluation can be performed taking into account the editing time of editing performed so far.

(10) The arrangement data may include editing time data indicating the editing time. The game program may further cause the processor to execute reading out the arrangement data stored in the memory, when the evaluation is performed. The evaluation is performed based on the editing time included in the read arrangement data.

According to the configuration of the above (10), evaluation can be performed at any timing after editing has been performed.

In the present specification, examples of an information processing apparatus and an information processing system for executing the processes in the above (1) to (10) are disclosed. Moreover, in the present specification, an example of a game processing method for executing the processes in the above (1) to (10) is disclosed.

According to the storage medium, the information processing system, the information processing apparatus, and the game processing method described above, evaluation of editing regarding arrangement of objects can be appropriately performed.

These and other objects, features, aspects and advantages of the exemplary embodiment will become more apparent from the following detailed description when taken in conjunction with the accompanying drawings.

DETAILED DESCRIPTION OF NON-LIMITING EXAMPLE EMBODIMENTS

1. Configuration of Game System

A game system according to an example of an exemplary embodiment is described below. An example of a game system 1 according to the exemplary embodiment includes a main body apparatus (an information processing apparatus; which functions as a game apparatus main body in the exemplary embodiment) 2, a left controller 3, and a right controller 4. Each of the left controller 3 and the right controller 4 is attachable to and detachable from the main body apparatus 2. That is, the game system 1 can be used as a unified apparatus obtained by attaching each of the left controller 3 and the right controller 4 to the main body apparatus 2. Further, in the game system 1, the main body apparatus 2, the left controller 3, and the right controller 4 can also be used as separate bodies (see FIG. 2). Hereinafter, first, the hardware configuration of the game system 1 according to the exemplary embodiment is described, and then, the control of the game system 1 according to the exemplary embodiment is described.

Figure 1:
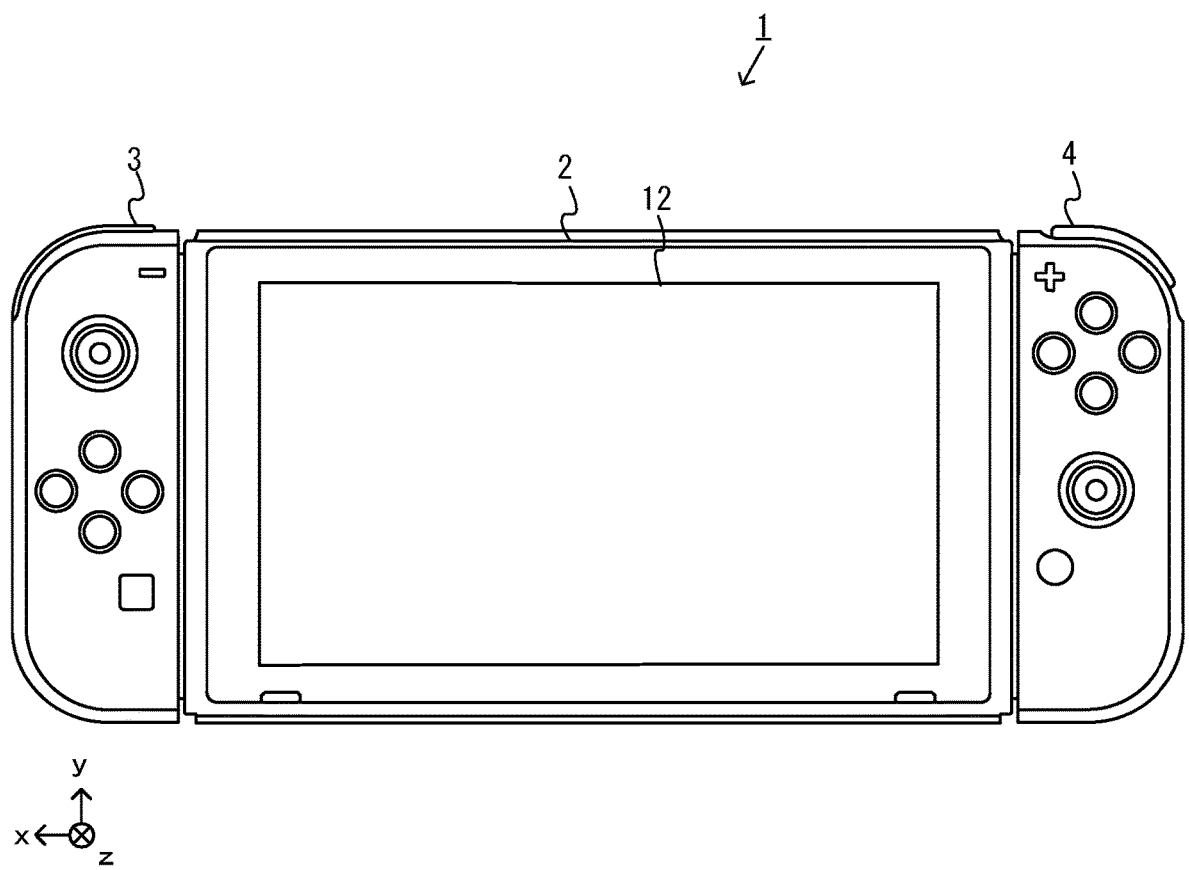
FIG. 1 is a diagram showing an example of the state where a non-limiting left controller and a non-limiting right controller are attached to a non-limiting main body apparatus.

FIG. 1 is a diagram showing an example of the state where the left controller 3 and the right controller 4 are attached to the main body apparatus 2. As shown in FIG. 1, each of the left controller 3 and the right controller 4 is attached to and unified with the main body apparatus 2. The main body apparatus 2 is an apparatus for performing various processes (e.g., game processing) in the game system 1. The main body apparatus 2 includes a display 12. Each of the left controller 3 and the right controller 4 is an apparatus including operation sections with which a user provides inputs.

Figure 2:
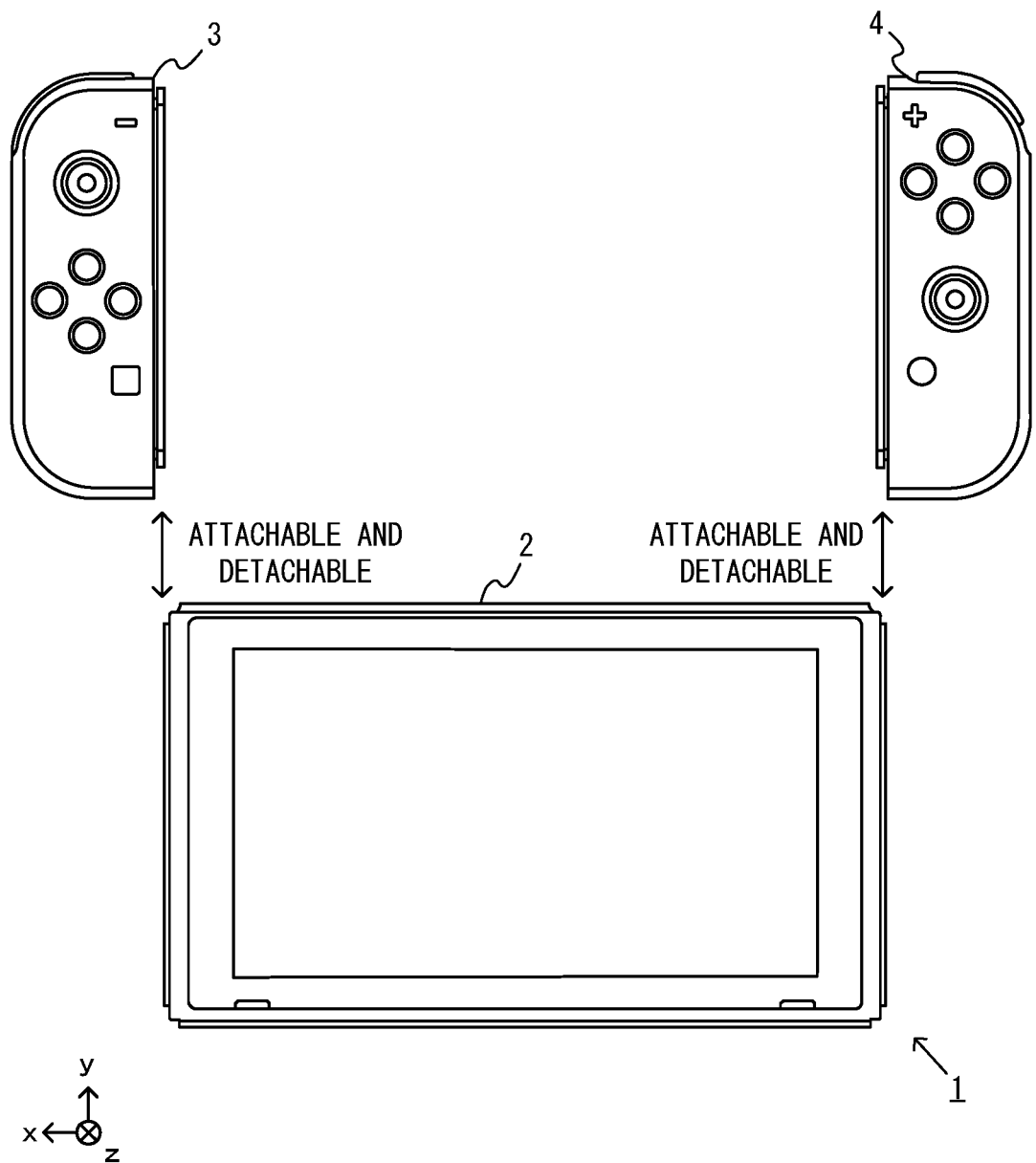
FIG. 2 is a diagram showing an example of the state where each of the non-limiting left controller and the non-limiting right controller is detached from the non-limiting main body apparatus.

FIG. 2 is a diagram showing an example of the state where each of the left controller 3 and the right controller 4 is detached from the main body apparatus 2. As shown in FIGS. 1 and 2, the left controller 3 and the right controller 4 are attachable to and detachable from the main body apparatus 2. It should be noted that hereinafter, the left controller 3 and the right controller 4 will occasionally be referred to collectively as a "controller".

Figure 3:
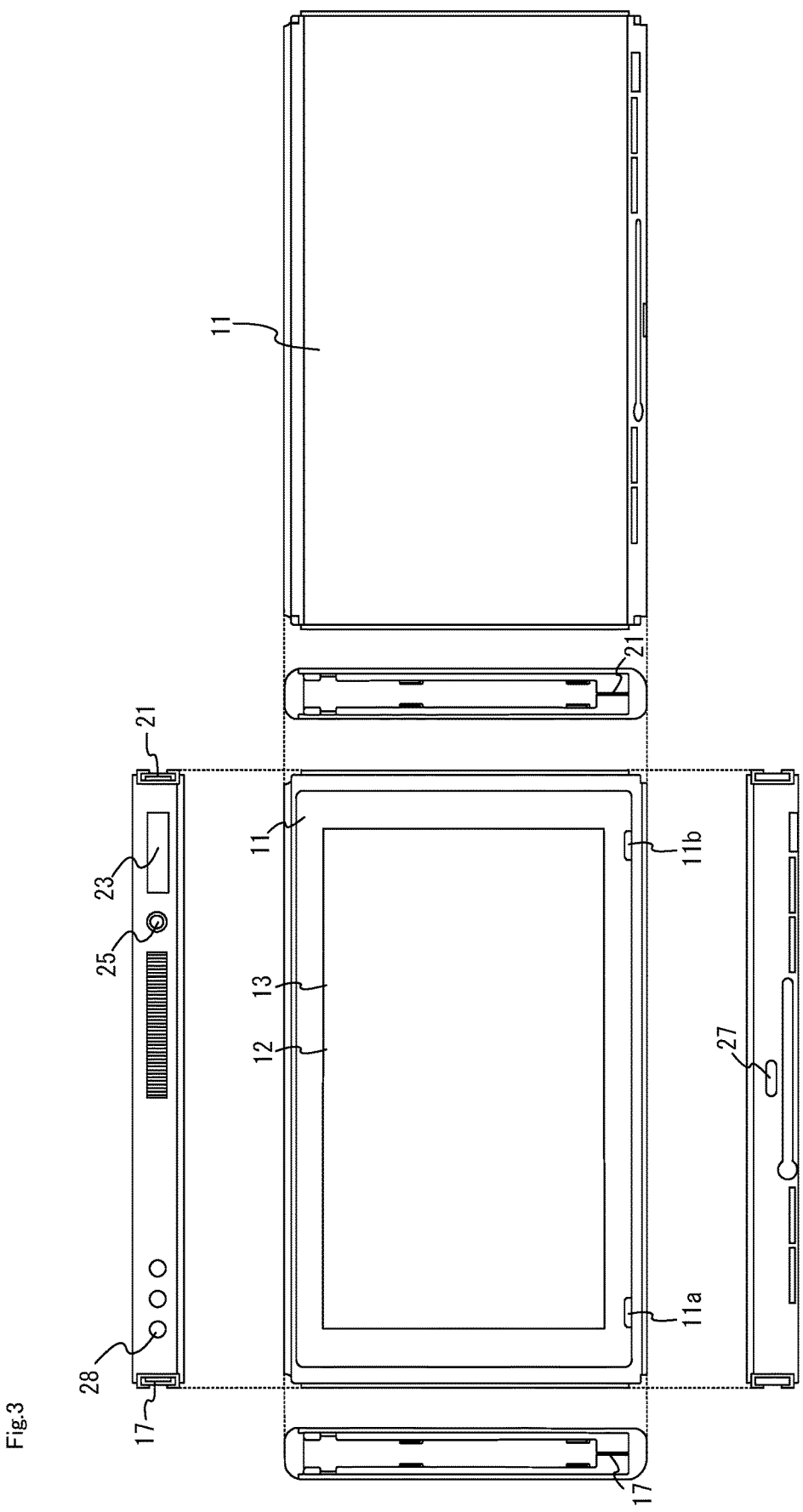
FIG. 3 is six orthogonal views showing an example of the non-limiting main body apparatus.

FIG. 3 is six orthogonal views showing an example of the main body apparatus 2. As shown in FIG. 3, the main body apparatus 2 includes an approximately plate-shaped housing 11. In the exemplary embodiment, a main surface (in other words, a surface on a front side, i.e., a surface on which the display 12 is provided) of the housing 11 has a generally rectangular shape.

It should be noted that the shape and the size of the housing 11 are optional. As an example, the housing 11 may be of a portable size. Further, the main body apparatus 2 alone or the unified apparatus obtained by attaching the left controller 3 and the right controller 4 to the main body apparatus 2 may function as a mobile apparatus. The main body apparatus 2 or the unified apparatus may function as a handheld apparatus or a portable apparatus.

As shown in FIG. 3, the main body apparatus 2 includes the display 12, which is provided on the main surface of the housing 11. The display 12 displays an image generated by the main body apparatus 2. In the exemplary embodiment, the display 12 is a liquid crystal display device (LCD). The display 12, however, may be a display device of any type.

Further, the main body apparatus 2 includes a touch panel 13 on a screen of the display 12. In the exemplary embodiment, the touch panel 13 is of a type that allows a multi-touch input (e.g., a capacitive type). The touch panel 13, however, may be of any type. For example, the touch panel 13 may be of a type that allows a single-touch input (e.g., a resistive type).

The main body apparatus 2 includes speakers (i.e., speakers 88 shown in FIG. 6) within the housing 11. As shown in FIG. 3, speaker holes 11a and 11b are formed on the main surface of the housing 11. Then, sounds output from the speakers 88 are output through the speaker holes 11a and 11b.

Further, the main body apparatus 2 includes a left terminal 17, which is a terminal for the main body apparatus 2 to perform wired communication with the left controller 3, and a right terminal 21, which is a terminal for the main body apparatus 2 to perform wired communication with the right controller 4.

As shown in FIG. 3, the main body apparatus 2 includes a slot 23. The slot 23 is provided on an upper side surface of the housing 11. The slot 23 is so shaped as to allow a predetermined type of storage medium to be attached to the slot 23. The predetermined type of storage medium is, for example, a dedicated storage medium (e.g., a dedicated memory card) for the game system 1 and an information processing apparatus of the same type as the game system 1. The predetermined type of storage medium is used to store, for example, data (e.g., saved data of an application or the like) used by the main body apparatus 2 and/or a program (e.g., a program for an application or the like) executed by the main body apparatus 2. Further, the main body apparatus 2 includes a power button 28.

The main body apparatus 2 includes a lower terminal 27. The lower terminal 27 is a terminal for the main body apparatus 2 to communicate with a cradle. In the exemplary embodiment, the lower terminal 27 is a USB connector (more specifically, a female connector). Further, when the unified apparatus or the main body apparatus 2 alone is mounted on the cradle, the game system 1 can display on a stationary monitor an image generated by and output from the main body apparatus 2. Further, in the exemplary embodiment, the cradle has the function of charging the unified apparatus or the main body apparatus 2 alone mounted on the cradle. Further, the cradle has the function of a hub device (specifically, a USB hub).

Figure 4:
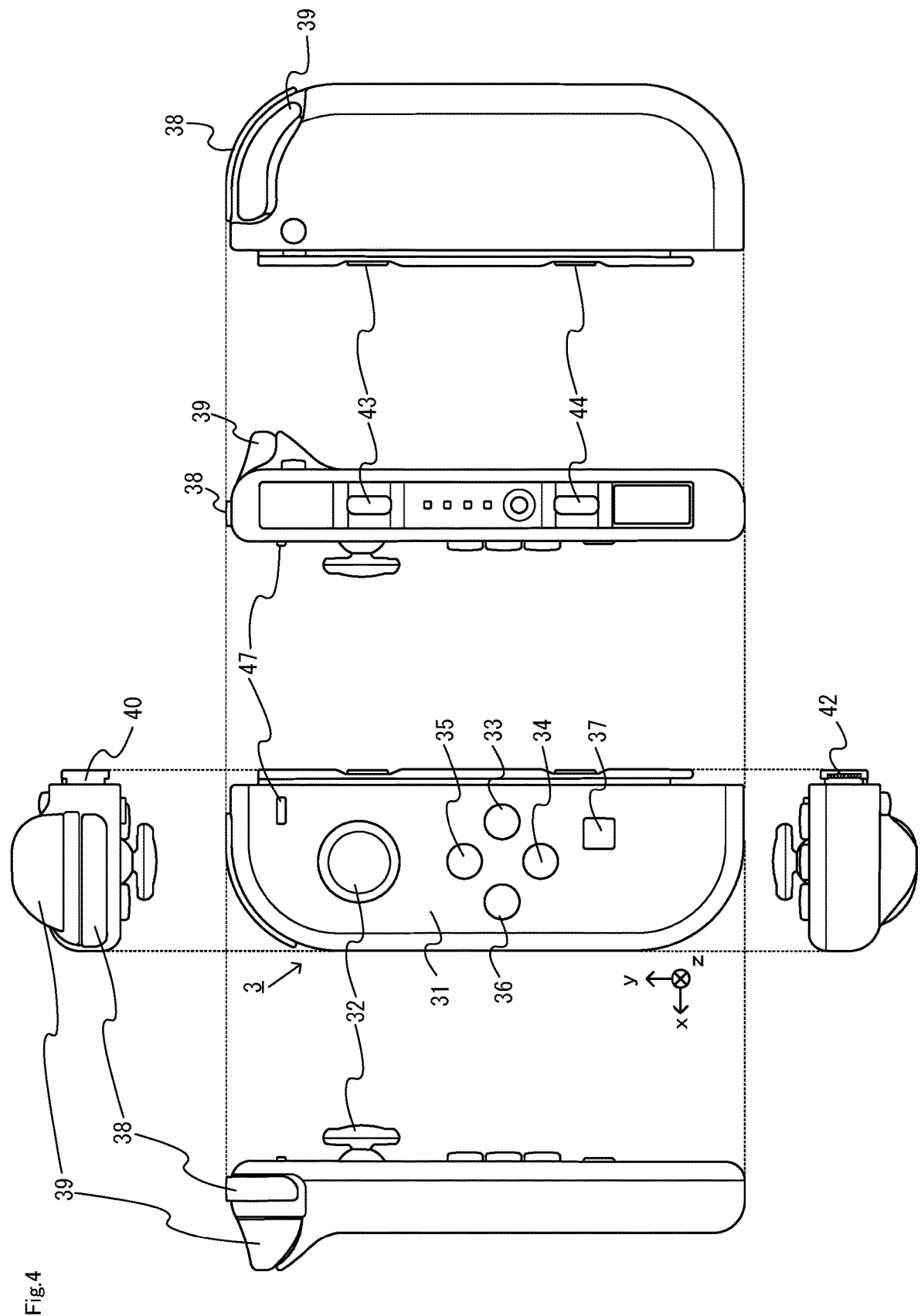
FIG. 4 is six orthogonal views showing an example of the non-limiting left controller.

FIG. 4 is six orthogonal views showing an example of the left controller 3. As shown in FIG. 4, the left controller 3 includes a housing 31. In the exemplary embodiment, the housing 31 has a vertically long shape, i.e., is shaped to be long in an up-down direction (i.e., a y-axis direction shown in FIGS. 1 and 4). In the state where the left controller 3 is detached from the main body apparatus 2, the left controller 3 can also be held in the orientation in which the left controller 3 is vertically long. The housing 31 has such a shape and a size that when held in the orientation in which the housing 31 is vertically long, the housing 31 can be held with one hand, particularly the left hand. Further, the left controller 3 can also be held in the orientation in which the left controller 3 is horizontally long. When held in the orientation in which the left controller 3 is horizontally long, the left controller 3 may be held with both hands.

The left controller 3 includes an analog stick 32. As shown in FIG. 4, the analog stick 32 is provided on a main surface of the housing 31. The analog stick 32 can be used as a direction input section with which a direction can be input. The user tilts the analog stick 32 and thereby can input a direction corresponding to the direction of the tilt (and input a magnitude corresponding to the angle of the tilt). It should be noted that the left controller 3 may include a directional pad, a slide stick that allows a slide input, or the like as the direction input section, instead of the analog stick. Further, in the exemplary embodiment, it is possible to provide an input by pressing the analog stick 32.

The left controller 3 includes various operation buttons. The left controller 3 includes four operation buttons 33 to 36 (specifically, a right direction button 33, a down direction button 34, an up direction button 35, and a left direction button 36) on the main surface of the housing 31. Further, the left controller 3 includes a record button 37 and a "−" (minus) button 47. The left controller 3 includes a first L-button 38 and a ZL-button 39 in an upper left portion of a side surface of the housing 31. Further, the left controller 3 includes a second L-button 43 and a second R-button 44, on the side surface of the housing 31 on which the left controller 3 is attached to the main body apparatus 2. These operation buttons are used to give instructions depending on various programs (e.g., an OS program and an application program) executed by the main body apparatus 2.

Further, the left controller 3 includes a terminal 42 for the left controller 3 to perform wired communication with the main body apparatus 2.

Figure 5:
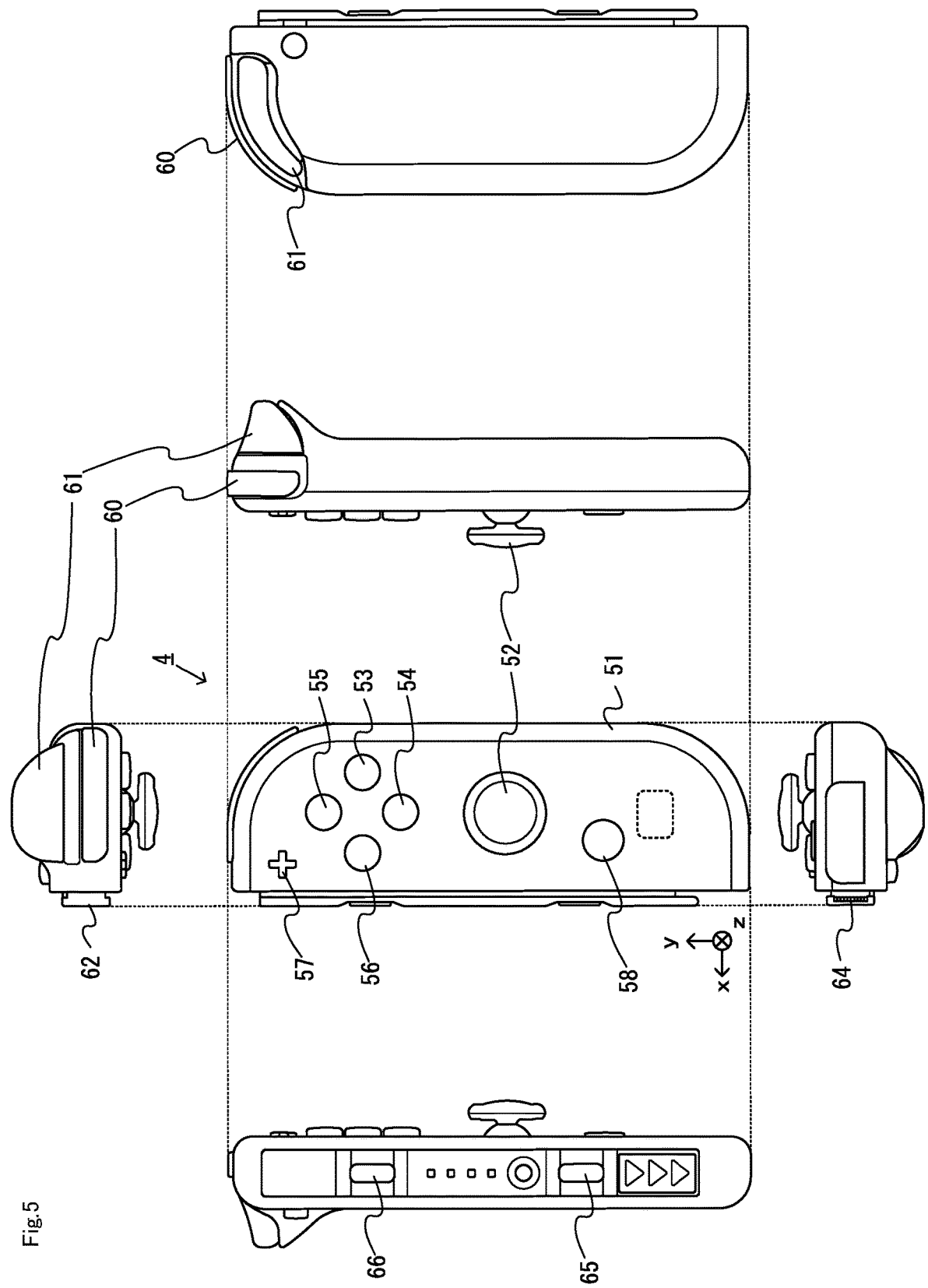
FIG. 5 is six orthogonal views showing an example of the non-limiting right controller.

FIG. 5 is six orthogonal views showing an example of the right controller 4. As shown in FIG. 5, the right controller 4 includes a housing 51. In the exemplary embodiment, the housing 51 has a vertically long shape, i.e., is shaped to be long in the up-down direction. In the state where the right controller 4 is detached from the main body apparatus 2, the right controller 4 can also be held in the orientation in which the right controller 4 is vertically long. The housing 51 has such a shape and a size that when held in the orientation in which the housing 51 is vertically long, the housing 51 can be held with one hand, particularly the right hand. Further, the right controller 4 can also be held in the orientation in which the right controller 4 is horizontally long. When held in the orientation in which the right controller 4 is horizontally long, the right controller 4 may be held with both hands.

Similarly to the left controller 3, the right controller 4 includes an analog stick 52 as a direction input section. In the exemplary embodiment, the analog stick 52 has the same configuration as that of the analog stick 32 of the left controller 3. Further, the right controller 4 may include a directional pad, a slide stick that allows a slide input, or the like, instead of the analog stick. Further, similarly to the left controller 3, the right controller 4 includes four operation buttons 53 to 56 (specifically, an A-button 53, a B-button 54, an X-button 55, and a Y-button 56) on a main surface of the housing 51. Further, the right controller 4 includes a "+" (plus) button 57 and a home button 58. Further, the right controller 4 includes a first R-button 60 and a ZR-button 61 in an upper right portion of a side surface of the housing 51. Further, similarly to the left controller 3, the right controller 4 includes a second L-button 65 and a second R-button 66.

Further, the right controller 4 includes a terminal 64 for the right controller 4 to perform wired communication with the main body apparatus 2.

Figure 6:
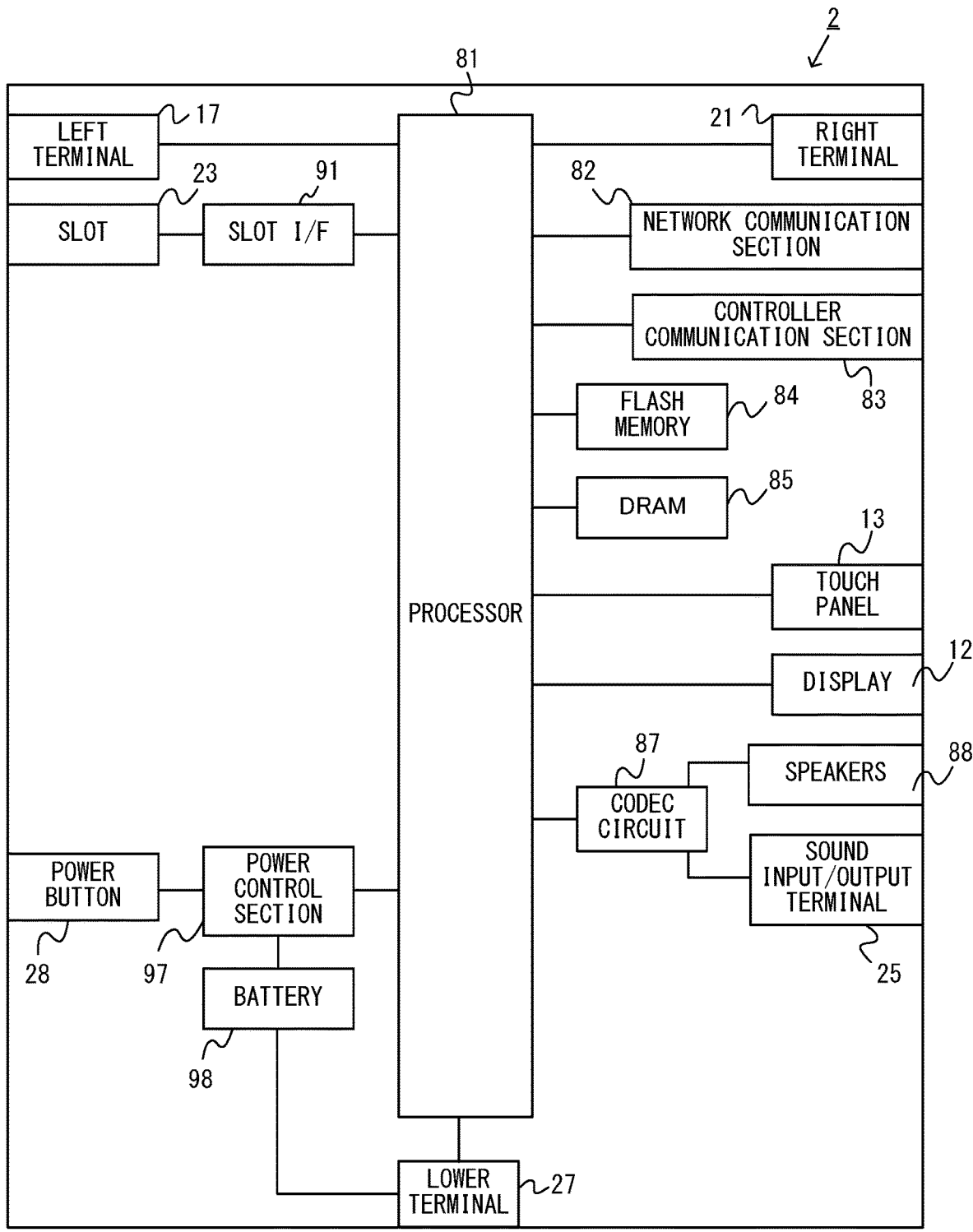
FIG. 6 is a block diagram showing an example of the internal configuration of the non-limiting main body apparatus.

FIG. 6 is a block diagram showing an example of the internal configuration of the main body apparatus 2. The main body apparatus 2 includes components 81 to 85, 87, 88, 91, 97, and 98 shown in FIG. 6 in addition to the components shown in FIG. 3. Some of the components 81 to 85, 87, 88, 91, 97, and 98 may be mounted as electronic components on an electronic circuit board and accommodated in the housing 11.

The main body apparatus 2 includes a processor 81. The processor 81 is an information processing section for executing various types of information processing to be executed by the main body apparatus 2. For example, the processor 81 may be composed only of a CPU (Central Processing Unit), or may be composed of a SoC (System-on-a-chip) having a plurality of functions such as a CPU function and a GPU (Graphics Processing Unit) function. The processor 81 executes an information processing program (e.g., a game program) stored in a storage section (specifically, an internal storage medium such as a flash memory 84, an external storage medium attached to the slot 23, or the like), thereby performing the various types of information processing.

The main body apparatus 2 includes a flash memory 84 and a DRAM (Dynamic Random Access Memory) 85 as examples of internal storage media built into the main body apparatus 2. The flash memory 84 and the DRAM 85 are connected to the processor 81. The flash memory 84 is a memory mainly used to store various data (or programs) to be saved in the main body apparatus 2. The DRAM 85 is a memory used to temporarily store various data used for information processing.

The main body apparatus 2 includes a slot interface (hereinafter abbreviated as "I/F") 91. The slot I/F 91 is connected to the processor 81. The slot I/F 91 is connected to the slot 23, and in accordance with an instruction from the processor 81, reads and writes data from and to the predetermined type of storage medium (e.g., a dedicated memory card) attached to the slot 23.

The processor 81 appropriately reads and writes data from and to the flash memory 84, the DRAM 85, and each of the above storage media, thereby performing the above information processing.

The main body apparatus 2 includes a network communication section 82. The network communication section 82 is connected to the processor 81. The network communication section 82 communicates (specifically, through wireless communication) with an external apparatus via a network. In the exemplary embodiment, as a first communication form, the network communication section 82 connects to a wireless LAN and communicates with an external apparatus, using a method compliant with the Wi-Fi standard. Further, as a second communication form, the network communication section 82 wirelessly communicates with another main body apparatus 2 of the same type, using a predetermined communication method (e.g., communication based on a unique protocol or infrared light communication). It should be noted that the wireless communication in the above second communication form achieves the function of enabling so-called "local communication" in which the main body apparatus 2 can wirelessly communicate with another main body apparatus 2 placed in a closed local network area, and the plurality of main body apparatuses 2 directly communicate with each other to transmit and receive data.

The main body apparatus 2 includes a controller communication section 83. The controller communication section 83 is connected to the processor 81. The controller communication section 83 wirelessly communicates with the left controller 3 and/or the right controller 4. The communication method between the main body apparatus 2 and the left controller 3 and the right controller 4 is optional. In the exemplary embodiment, the controller communication section 83 performs communication compliant with the Bluetooth (registered trademark) standard with the left controller 3 and with the right controller 4.

The processor 81 is connected to the left terminal 17, the right terminal 21, and the lower terminal 27. When performing wired communication with the left controller 3, the processor 81 transmits data to the left controller 3 via the left terminal 17 and also receives operation data from the left controller 3 via the left terminal 17. Further, when performing wired communication with the right controller 4, the processor 81 transmits data to the right controller 4 via the right terminal 21 and also receives operation data from the right controller 4 via the right terminal 21. Further, when communicating with the cradle, the processor 81 transmits data to the cradle via the lower terminal 27. As described above, in the exemplary embodiment, the main body apparatus 2 can perform both wired communication and wireless communication with each of the left controller 3 and the right controller 4. Further, when the unified apparatus obtained by attaching the left controller 3 and the right controller 4 to the main body apparatus 2 or the main body apparatus 2 alone is attached to the cradle, the main body apparatus 2 can output data (e.g., image data or sound data) to the stationary monitor or the like via the cradle.

Here, the main body apparatus 2 can communicate with a plurality of left controllers 3 simultaneously (in other words, in parallel). Further, the main body apparatus 2 can communicate with a plurality of right controllers 4 simultaneously (in other words, in parallel). Thus, a plurality of users can simultaneously provide inputs to the main body apparatus 2, each using a set of the left controller 3 and the right controller 4. As an example, a first user can provide an input to the main body apparatus 2 using a first set of the left controller 3 and the right controller 4, and simultaneously, a second user can provide an input to the main body apparatus 2 using a second set of the left controller 3 and the right controller 4.

Further, the display 12 is connected to the processor 81. The processor 81 displays a generated image (e.g., an image generated by executing the above information processing) and/or an externally acquired image on the display 12.

The main body apparatus 2 includes a codec circuit 87 and speakers (specifically, a left speaker and a right speaker) 88. The codec circuit 87 is connected to the speakers 88 and a sound input/output terminal 25 and also connected to the processor 81. The codec circuit 87 is a circuit for controlling the input and output of sound data to and from the speakers 88 and the sound input/output terminal 25.

The main body apparatus 2 includes a power control section 97 and a battery 98. The power control section 97 is connected to the battery 98 and the processor 81. Further, although not shown in FIG. 6, the power control section 97 is connected to components of the main body apparatus 2 (specifically, components that receive power supplied from the battery 98, the left terminal 17, and the right terminal 21). Based on a command from the processor 81, the power control section 97 controls the supply of power from the battery 98 to the above components.

Further, the battery 98 is connected to the lower terminal 27. When an external charging device (e.g., the cradle) is connected to the lower terminal 27, and power is supplied to the main body apparatus 2 via the lower terminal 27, the battery 98 is charged with the supplied power.

Figure 7:
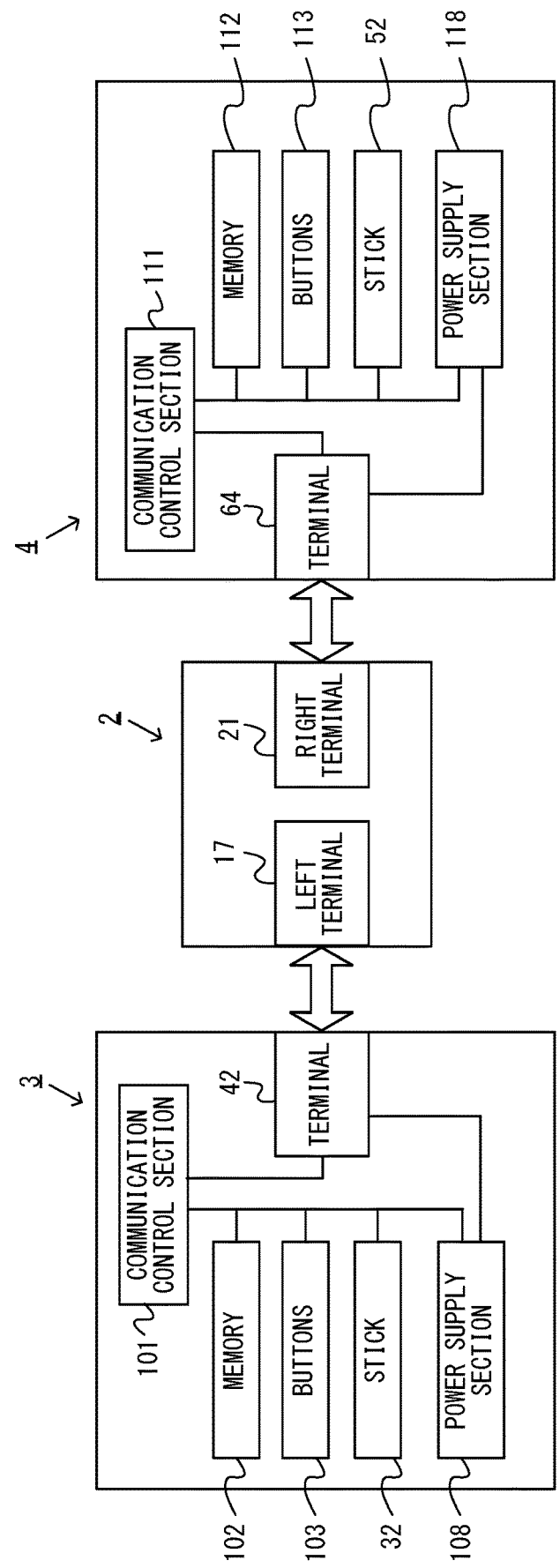
FIG. 7 is a block diagram showing an example of the internal configurations of the non-limiting main body apparatus and the non-limiting left and right controllers.

FIG. 7 is a block diagram showing examples of the internal configurations of the main body apparatus 2, the left controller 3, and the right controller 4. It should be noted that the details of the internal configuration of the main body apparatus 2 are shown in FIG. 6 and therefore are omitted in FIG. 7.

The left controller 3 includes a communication control section 101, which communicates with the main body apparatus 2. As shown in FIG. 7, the communication control section 101 is connected to components including the terminal 42. In the exemplary embodiment, the communication control section 101 can communicate with the main body apparatus 2 through both wired communication via the terminal 42 and wireless communication not via the terminal 42. The communication control section 101 controls the method for communication performed by the left controller 3 with the main body apparatus 2. That is, when the left controller 3 is attached to the main body apparatus 2, the communication control section 101 communicates with the main body apparatus 2 via the terminal 42. Further, when the left controller 3 is detached from the main body apparatus 2, the communication control section 101 wirelessly communicates with the main body apparatus 2 (specifically, the controller communication section 83). The wireless communication between the communication control section 101 and the controller communication section 83 is performed in accordance with the Bluetooth (registered trademark) standard, for example.

Further, the left controller 3 includes a memory 102 such as a flash memory. The communication control section 101 includes, for example, a microcomputer (or a microprocessor) and executes firmware stored in the memory 102, thereby performing various processes.

The left controller 3 includes buttons 103 (specifically, the buttons 33 to 39, 43, 44, and 47). Further, the left controller 3 includes the analog stick ("stick" in FIG. 7) 32. Each of the buttons 103 and the analog stick 32 outputs information regarding an operation performed on itself to the communication control section 101 repeatedly at appropriate timing.

The communication control section 101 acquires information regarding an input (specifically, information regarding an operation or the detection result of the sensor) from each of input sections (specifically, the buttons 103 and the analog stick 32). The communication control section 101 transmits operation data including the acquired information (or information obtained by performing predetermined processing on the acquired information) to the main body apparatus 2. It should be noted that the operation data is transmitted repeatedly, once every predetermined time. It should be noted that the interval at which the information regarding an input is transmitted from each of the input sections to the main body apparatus 2 may or may not be the same.

The above operation data is transmitted to the main body apparatus 2, whereby the main body apparatus 2 can obtain inputs provided to the left controller 3. That is, the main body apparatus 2 can determine operations on the buttons 103 and the analog stick 32 based on the operation data.

The left controller 3 includes a power supply section 108. In the exemplary embodiment, the power supply section 108 includes a battery and a power control circuit. Although not shown in FIG. 7, the power control circuit is connected to the battery and also connected to components of the left controller 3 (specifically, components that receive power supplied from the battery).

As shown in FIG. 7, the right controller 4 includes a communication control section 111, which communicates with the main body apparatus 2. Further, the right controller 4 includes a memory 112, which is connected to the communication control section 111. The communication control section 111 is connected to components including the terminal 64. The communication control section 111 and the memory 112 have functions similar to those of the communication control section 101 and the memory 102, respectively, of the left controller 3. Thus, the communication control section 111 can communicate with the main body apparatus 2 through both wired communication via the terminal 64 and wireless communication not via the terminal 64 (specifically, communication compliant with the Bluetooth (registered trademark) standard). The communication control section 111 controls the method for communication performed by the right controller 4 with the main body apparatus 2.

The right controller 4 includes input sections similar to the input sections of the left controller 3. Specifically, the right controller 4 includes buttons 113 and the analog stick 52. These input sections have functions similar to those of the input sections of the left controller 3 and operate similarly to the input sections of the left controller 3.

The right controller 4 includes a power supply section 118. The power supply section 118 has a function similar to that of the power supply section 108 of the left controller 3 and operates similarly to the power supply section 108.

Figure 8:
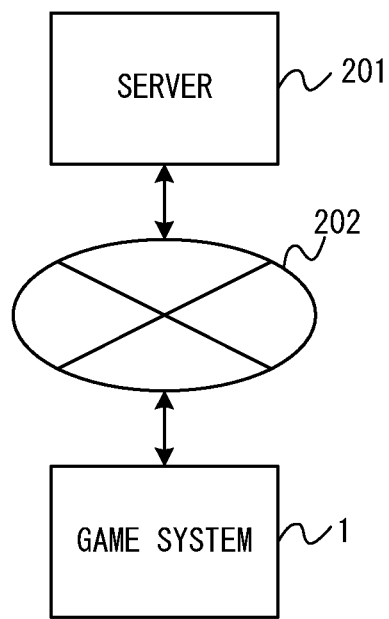
FIG. 8 is a block diagram showing an example of a configuration in which the non-limiting game system shown in FIG. 1 is communicably connected to a non-limiting server.

FIG. 8 is a block diagram showing an example of a configuration in which the game system shown in FIG. 1 is communicably connected to a server. In the exemplary embodiment, the game system 1 is communicably connected to a server 201 via a network 202. That is, the game system 1 and the server 201 are connectable to the network 202 such as the Internet and/or a mobile communication network. The game system 1 and the server 201 are communicable with each other via the network 202. The server 201 is also communicable with other game systems that are of the same type as the game system 1 and are used by users different from the user of the game system 1. Although described later in detail, the server 201 receives, via the network 202, game data of a game executed in the game system 1 and the like, and stores the game data. The server 201 is an information processing apparatus or an information processing system including a control section (specifically, a processor) and a storage section. The server 201 includes a communication section that is connected to the network 202 and has a function of communicating with other apparatuses (e.g., the game system 1) via the network 202.

2. Outline of Processing in Game System

Next, an outline of processing executed in the game system 1 will be described with reference to FIGS. 9 to 14. In the exemplary embodiment, the game system 1 executes a game in which an object is placed in a game space which is a virtual space. In the exemplary embodiment, in the game, a user (also referred to as a player) can perform editing regarding the placed object in a predetermined editing area in the game space. In the exemplary embodiment, the editing area is a room of a character that appears in the game.

[2-1. Editing of Editing Area]

Figure 9:
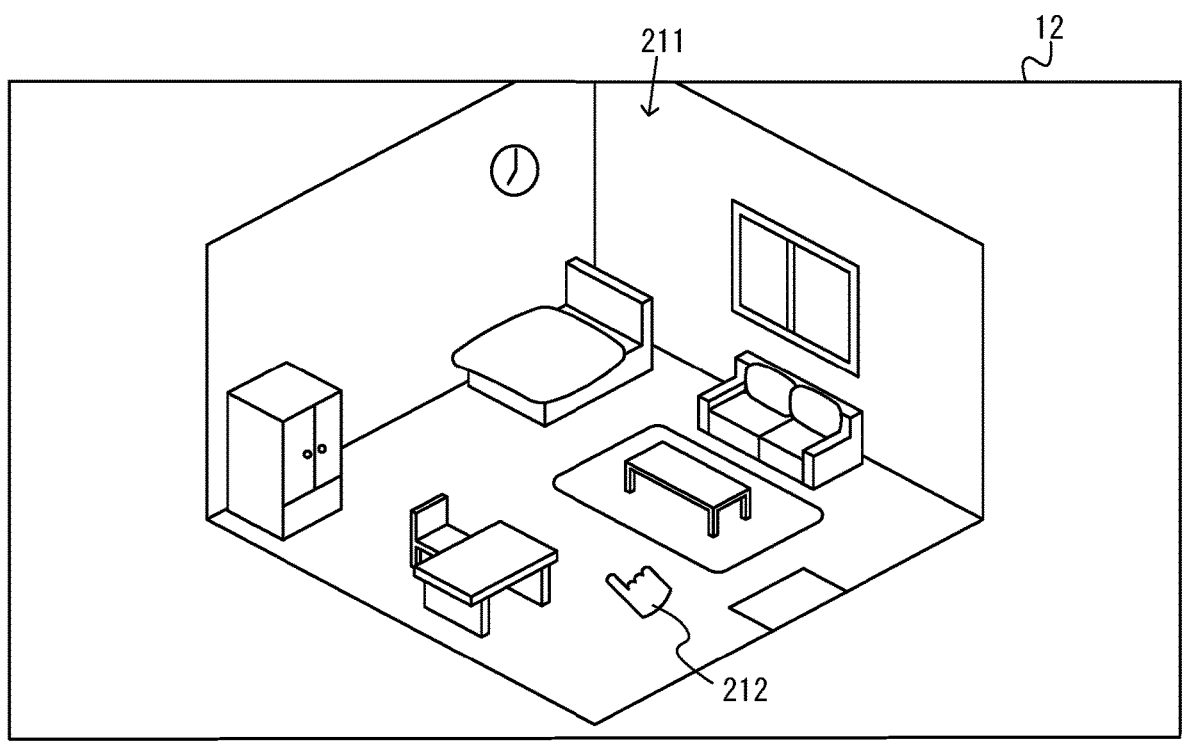
FIG. 9 shows an example of a game image in a non-limiting editing mode.

First, a process regarding editing of an editing area will be described. FIG. 9 shows an example of a game image in an editing mode. In the exemplary embodiment, during the game, the user can start the editing mode of performing editing in the editing area. For example, when a player character operated by the user receives a request for room coordination from a non-player character that appears in the game, the editing mode of editing the room of the non-player character is started.

A room 211 shown in FIG. 9 is an example of the editing area in which the user can perform editing. As shown in FIG. 9, in the room 211 as an example of the editing area, one or more placement objects are placed. Each placement object is an object on which the user can perform editing regarding placement thereof in the editing area. Specifically, examples of the placement objects include furniture objects such as a desk and a bed, and objects of items such as a clock and a vase.

As described above, in the exemplary embodiment, the editing area is a room in the virtual space, and the placement objects are a plurality of types of objects including at least furniture. However, the contents of the editing area and the placement objects are discretionary. For example, the specific example of the editing area may not necessarily be a room of a character, and may be a yard or the like of the house of the character. The specific examples of the placement objects may be objects of types other than furniture and items, such as objects of trees planted in the yard.

In the editing mode, the user can make an instruction for editing a placement object in the editing area. That is, in the editing mode, the game system 1 performs editing regarding a placement object in the editing area, based on an operation input performed by the user. The "editing regarding a placement object" includes: designating an object to be placed in the editing area; placing the designated object in the editing area; moving the object placed in the editing area; deleting, from the editing area, the object placed in the editing area; and the like. This allows the user to place a desired placement object in the editing area, and arrange the placement object at a desired position and in a desired direction in the editing area. In the example shown in FIG. 9, the user can operate a cursor 212, and designates, with the cursor 212, a placement object to be operated.

Figure 10:
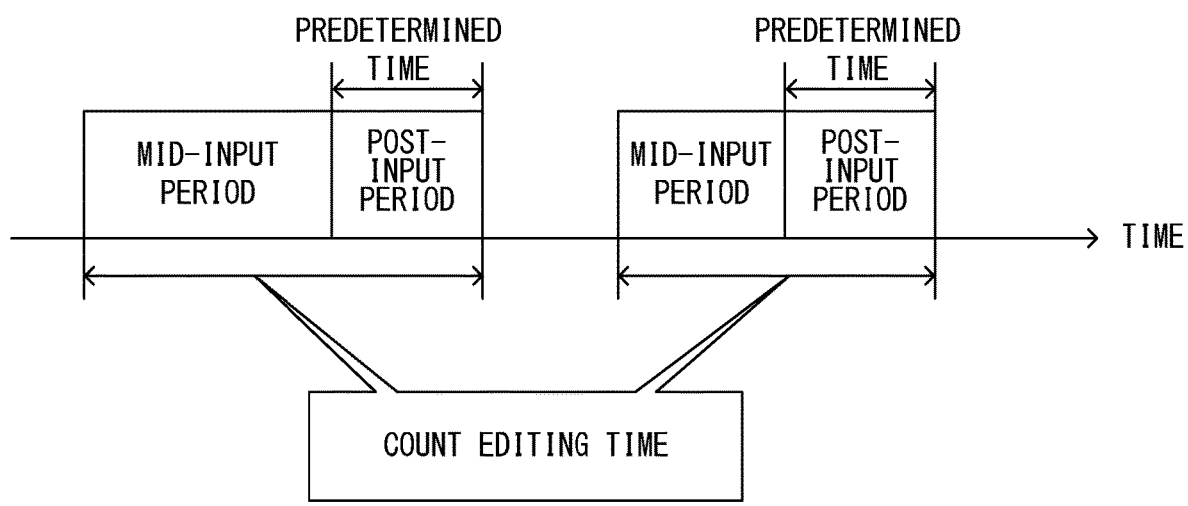
FIG. 10 shows an example of a non-limiting method for counting an editing time.

In the exemplary embodiment, in the editing mode, the game system 1 measures a time during which the user performs editing. FIG. 10 shows an example of an editing time counting method. As shown in FIG. 10, the game system 1 counts the time during a period in which the user is performing an input in the editing mode (this period is referred to as "mid-input period") and a period until a predetermined time elapses from when the input has ended (this period is referred to as "post-input period). The game system 1 regards the counted time as the editing time. When the predetermined time has elapsed from when the input ended, the game system 1 stops counting the editing time. Then, when an input is performed again by the user, the game system 1 resumes counting the editing time. Thus, the counted editing time is a time indicating the length of the mid-input period and the post-input period in the editing mode.

During the editing mode, the game system 1 counts the editing time according to the above method. Then, the game system 1 stores the counted time at the end of the editing mode, as the editing time regarding the editing in the editing mode. In the following description, the editing time in one editing mode may be referred to as "individual editing time" so as to be distinguished from "cumulative editing time" described later. The game system 1 stores the individual editing time in association with the editing area (i.e., the room) or the non-player character corresponding to the editing area (i.e., the non-player character living in the room).

As described above, in the exemplary embodiment, counting of the editing time is performed based on a determination as to whether or not an input is being performed in a period in which editing is allowed (i.e., the editing mode period). Thus, the time in which the user is performing an input during the above period can be counted as the editing time (specifically, the individual editing time). Thus, whether or not the user actually takes time and effort for editing can be accurately determined.

In the exemplary embodiment, the game system 1 counts the editing time with respect to any input to the game system 1, regardless of the content of an instruction made by the input. However, in another embodiment, for example, if an input not to be used for the game is made (i.e., if an input to a specific button on the controller is not used for the game), the game system 1 may not necessarily count the editing time for such an input.

In another embodiment, when the same input continues for a predetermined time or more (e.g., when one button continues to be pressed), the game system 1 may not necessarily count the editing time for a part or the entirety of a period in which this input is performed. This is because such an input is considered to be performed only for the purpose of counting an editing time while the user does not substantially perform editing. The game system 1 may not necessarily count the editing time for a part of the period in which the above input is performed (e.g., for a period after the same input continues for a predetermined time or more), or may not necessarily count the editing time for the entirety of the period in which the above input is performed.

When editing in the editing mode has been completed, the user ends the editing mode by making an editing end instruction. That is, with the editing end instruction performed by the user, the game system 1 determines that editing in the editing mode has been completed. The condition for determining that editing in the editing mode has been completed is discretionary. In another embodiment, the game system 1 may determine that editing in the editing mode has been completed, according to a predetermined completion condition (e.g., a predetermined number of placement objects having been placed).

When editing in the editing mode has been completed, the game system 1 stores arrangement data indicating information regarding the edited room (specifically, information about arrangement of placement objects, or the like). The arrangement data is stored in association with the room having been edited, or the non-player character corresponding to the room (i.e., the non-player character living in the room). Individual editing time data indicating the individual editing time may be stored in association with the arrangement data (e.g., such that the individual editing time data is included in the arrangement data).

When editing in the editing mode has been completed, the game system 1 evaluates the editing. In the exemplary embodiment, the game system 1 displays a message based on evaluation of the editing (in other words, evaluation of the arrangement data) as a speech of the non-player character living in the room 211.

Figure 11:
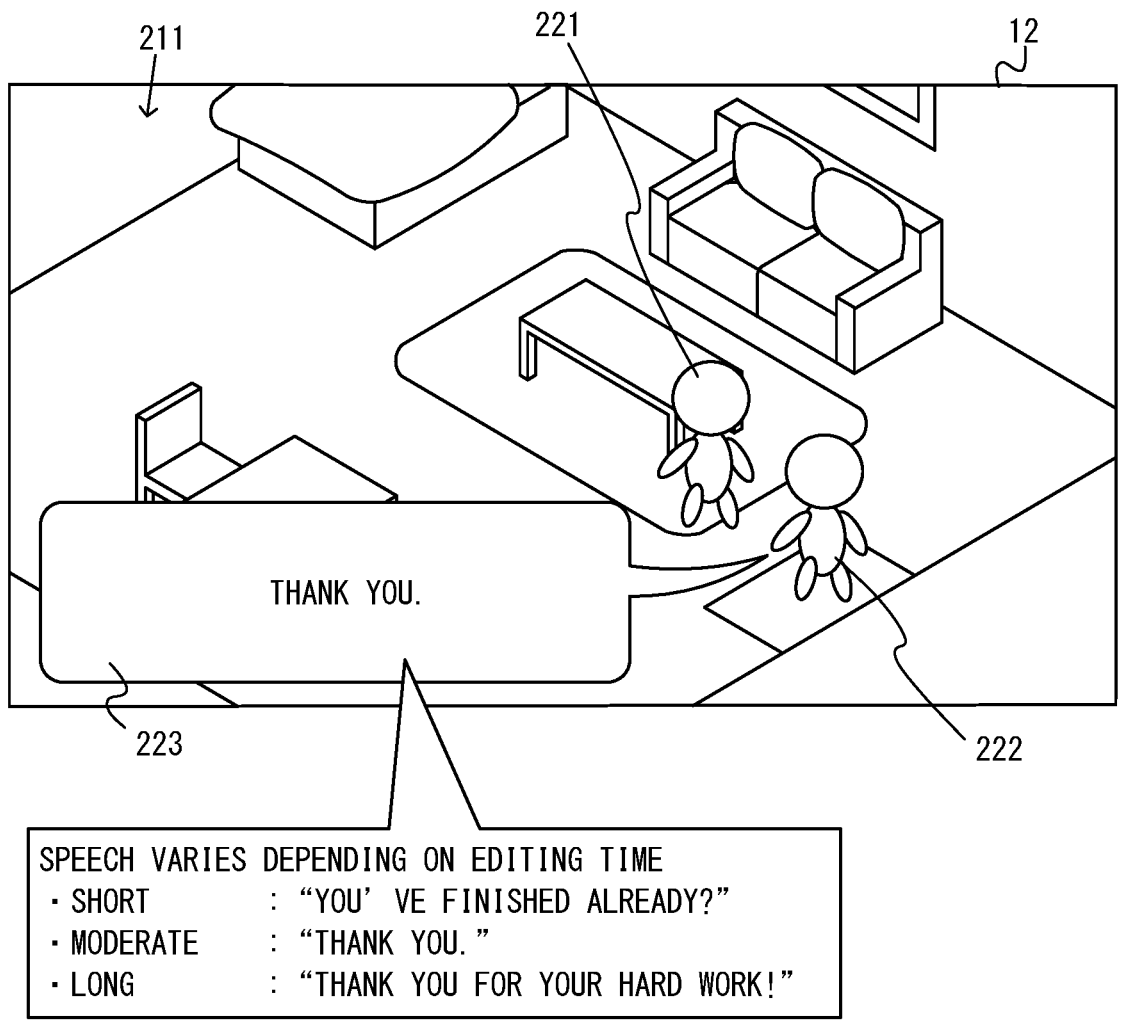
FIG. 11 shows an example of a game image displayed when the non-limiting editing mode ends.

FIG. 11 shows an example of a game image displayed at the end of the editing mode. As shown in FIG. 11, when the editing mode has ended, the game system 1 arranges a player character 221 and a non-player character 222 in the room 211 having been edited. Then, the game system 1 displays a message 223 indicating evaluation of the editing, as a speech of the non-player character 222.

In the exemplary embodiment, the content of the message 223 varies depending on the length of the individual editing time. Specifically, when the individual editing time is shorter than a predetermined first threshold value (e.g., 5 minutes), the game system 1 displays a message (e.g., "You've finished already?) indicating that the evaluation is low. When the individual editing time is longer than a predetermined second threshold value (e.g., 30 minutes), the game system 1 displays a message (e.g., "Thank you for your hard work!") indicating that the evaluation is high. When the individual editing time is moderate (i.e., when the individual editing time is not shorter than the first threshold value and not longer than the second threshold value), the game system 1 displays a message (e.g., "Thank you.") indicating that the evaluation is moderate.

As described above, in the exemplary embodiment, the game system 1 displays the message of the non-player character in the virtual space such that the content of the message varies according to the evaluation. The message allows the user to know the evaluation of the editing performed by himself/herself.

In another embodiment, the method for evaluating editing may not necessarily be the above method, and any method may be adopted. For example, the game system 1 may display a message indicating the evaluation result in a form different from the speech of the non-player character. Moreover, for example, the game system 1 may give a currency used in the game to the player character, as a reward for the request by the non-player character. At this time, the amount of currency to be given may be varied according to the individual editing time.

In the exemplary embodiment, evaluation is performed by directly using the individual editing time. However, in another embodiment, an evaluation score may be calculated based on the individual editing time, and an evaluation result may be displayed based on the evaluation score. For example, an evaluation score may be calculated such that the longer the individual editing time is, the greater the evaluation score is (specifically, such that the evaluation score is in proportion to the individual editing time). Meanwhile, the game system 1 may calculate an evaluation score with a specific period, of the period in which the individual editing time is counted, being weighted. For example, the game system 1 may calculate, as an evaluation score, a value obtained by multiplying the individual editing time by a predetermined coefficient (specifically, a coefficient larger than 1) with respect to a period in which a specific input is performed, and may use, as an evaluation score, the value of the individual editing time as it is (or may calculate a value obtained by multiplying the value of the individual editing time by a coefficient smaller than 1) with respect to a period in which an input different from the specific input is performed. The specific input is, for example, an operation input directly related to editing of a placement object. The game system 1 may deal with, as the specific input, an operation input for moving a placement object or an input for selecting a placement object to be arranged in the room 211. The input different from the specific input is an operation input not directly related to editing of a placement object. The game system 1 may deal with, as the input different from the specific input, an input for simply moving the cursor 212 (i.e., an input not for moving a placement object along with movement of the cursor 212) or an input for changing the direction of the virtual camera.

As described above, the game system 1 may calculate an evaluation score based on the individual editing time and on the content of an input (i.e., the content of an editing operation performed by the input), and may perform evaluation based on the evaluation score. Thus, accuracy of the evaluation based on the editing time can be improved.

In the exemplary embodiment, the game system 1 gives the user a reward according to the evaluation. Specifically, after the above editing mode, if the player character 221 talks to the non-player character 222 that has edited the room, the non-player character 222 gives the player character 221 an item, on the condition that the evaluation of the editing is high (i.e., the individual editing time is longer than the second threshold value). Thus, motivation to get a high evaluation of editing can be given to the user. The type of the item to be given may be the same regardless of the non-player character, may be set for each non-player character, or may be set according to the content of the evaluation (i.e., the individual editing time). The content of the reward according to the evaluation is discretionary. The reward may not necessarily be an item to be used in the game, and may be any reward related to the game, such as a currency used in the game.

The timing at which the reward is given is discretionary. In another embodiment, the reward may be given immediately after the editing mode has ended. For example, when displaying the message 223, the game system 1 may cause the item having the content according to the evaluation to be given from the non-player character 222 to the player character 221.

In the exemplary embodiment, the user can re-edit the room that was edited by the user according to the request for coordination from the non-player character. That is, in the exemplary embodiment, the non-player character may make a request for renovation of the room for which the non-player character made the request for coordination. When the player character has received the request for renovation, an editing mode of re-editing the room is started. In this editing mode, the game system 1 reads out the arrangement data indicating the current arrangement of the placement objects (i.e., the arrangement data stored in the previous editing), and performs editing on the arrangement indicated by the arrangement data, according to an operation input performed by the user.

Figure 12:
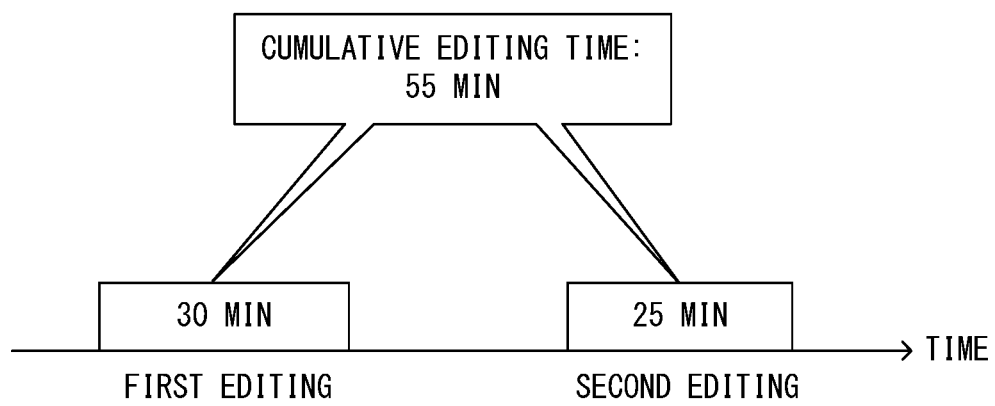
FIG. 12 shows an example of a non-limiting method for calculating a cumulative editing time.

When the re-editing is performed, the game system 1 calculates a cumulative editing time as an editing time regarding the room to be edited. FIG. 12 shows an example of a method for calculating the cumulative editing time. FIG. 12 shows an example in which the individual editing time of the first editing is 30 minutes and the individual editing time of the second editing (i.e., the above re-editing) is 25 minutes. In the editing mode of the second editing, the game system 1 counts the individual editing time by the same method as in the editing mode of the first editing.

After the second editing has been completed, the game system 1 calculates a cumulative editing time for the room having been subjected to the second editing. The cumulative editing time is the total editing time of the preceding editing (including the current editing) performed so far on the room having been subjected to the second editing. In the example shown in FIG. 12, the cumulative editing time at the time of completion of the second editing is 55 minutes which is the total of the individual editing time (30 minutes) of the first editing and the individual editing time (25 minutes) of the second editing. The game system 1 stores the cumulative editing time in association with the room having been edited (or the non-player character living in the room).

In the exemplary embodiment, at the time of completion of the second or subsequent editing, the game system 1 performs evaluation of the editing (specifically, determination of a speech of the non-player character), based on the individual editing time of the editing. Moreover, after completion of the second or subsequent editing, the game system 1 determines a reward to be given to the player character (specifically, an item to be given from the non-player character to the player character), based on the individual editing time. However, in another embodiment, the game system 1 may perform evaluation at the time of completion of the second or subsequent editing, based on the cumulative editing time, and may determine a reward to be given to the player character after completion of the second or subsequent editing, based on the cumulative editing time. Although described later in detail, the game system 1 uses the cumulative editing time to perform "list display" described later.

In the exemplary embodiment, the player character can edit a specific room even if there is no request from a non-player character. The specific room may be a room in which no non-player character lives, or may be a room in which a non-player character lives but does not make a request for editing. For example, the user can practice coordinating a room by editing the specific room. The game system 1 also stores arrangement data regarding the editing on the specific room, and also counts the editing time and stores editing time data. However, as for the editing of the specific room, a message indicating evaluation of the editing may not necessarily be displayed and a reward according to the evaluation may not necessarily be given, at the time of completion of the editing.

In the exemplary embodiment, when editing a room according to a request from the non-player character, the user can perform the editing by applying, to the room, a part or the entirety of arrangement of placement objects in the specific room. Specifically, when there is a predetermined instruction made by the user in the editing mode, the game system 1 reads out the arrangement data regarding the specific room, and changes arrangement of placement objects in the room being currently edited to the arrangement indicated by the arrangement data. Thus, the user can easily use the arrangement of the room, which he/she has created for practice, for editing of another room, thereby improving convenience of the user. In the exemplary embodiment, even after the arrangement in the placement objects in the room being currently edited has been changed as described above, the user can perform further editing, and can further change the arrangement in the specific room.

Figure 13:
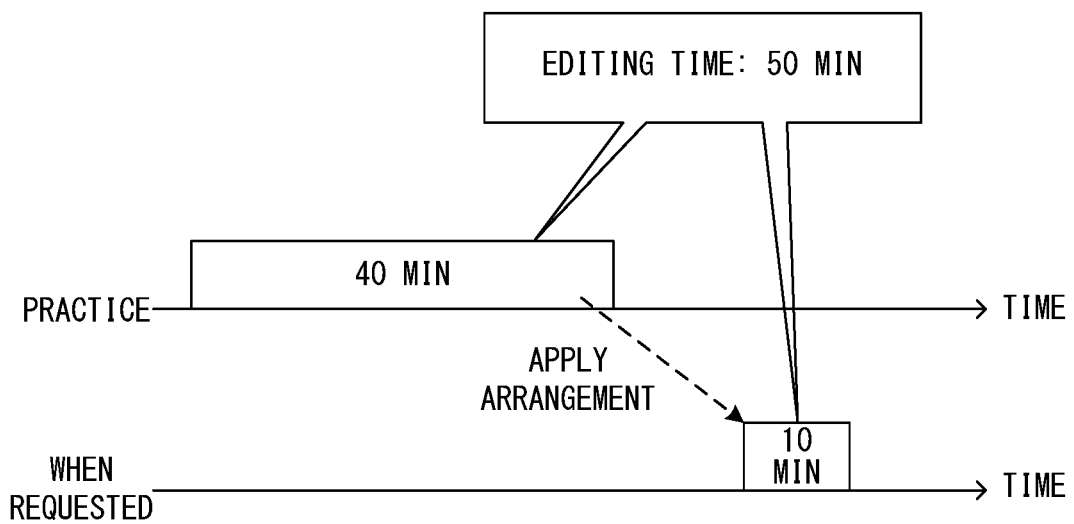
FIG. 13 shows an example of a non-limiting method for calculating an editing time when another arrangement is applied.

When another arrangement is applied to the room being currently edited as described above, the game system 1 calculates an individual editing time of the current editing, taking into account the editing time regarding the other arrangement. FIG. 13 shows an example of a method for calculating an editing time when another arrangement is applied. FIG. 13 shows an example in which the editing time of the specific room is 40 minutes, and the actual editing time of the editing to which the arrangement in the specific room is applied is 10 minutes. The phrase "actual editing time" means an editing time counted in the editing mode by the above method.

In the above case, the game system 1 adds, to the actual editing time (10 minutes in the example of FIG. 13) in the current editing mode, the editing time (40 minutes in the example of FIG. 13) regarding the other arrangement applied to the editing mode, thereby calculating the editing time (specifically, the individual editing time) in the editing mode. Therefore, in the example shown in FIG. 13, the editing time in the current editing mode is calculated to be 50 minutes. In the exemplary embodiment, the editing time to be added is the cumulative editing time regarding the other arrangement. In another embodiment, the editing time to be added may be the individual editing time.

As described above, in the exemplary embodiment, when, in certain editing, arrangement data of another editing is applied, the game system 1 calculates the editing time of the certain editing by using the editing time of the other editing (specifically, by adding the editing time of the other editing to the editing time counted in the certain editing). Thus, the editing time can be calculated taking into account the time and effort that the user has actually taken in the above-described case. Therefore, the game system 1 can obtain more accurate editing time.

[2-2. Display of List of Edited Rooms]

Next, a process of displaying a list of edited rooms will be described. In the exemplary embodiment, the game system 1 uploads the arrangement data regarding the room edited by the user of the game system 1, to the server 201 according to an instruction of the user. The server 201 stores the arrangement data transmitted from the game system 1, in association with the user. In the exemplary embodiment, the arrangement data transmitted from the game system 1 to the server 201 includes cumulative editing time data indicating the cumulative editing time. The server 201 also receives, from other game systems of the same type as the game system 1, arrangement data regarding rooms edited by users of the other game systems, and stores the arrangement data. That is, the server 201 stores arrangement data of a plurality of users performing the game.

In the exemplary embodiment, the game system 1 acquires, from the server 201, a list of edited rooms (in other words, a list of arrangement data) of other users, according to an instruction of the user, and displays the acquired list. Thus, the user of the game system 1 can see the list of the rooms edited by the other users. Specifically, with the instruction of the user, the game system 1 performs a list acquisition request to the server 201. In response to the list acquisition request, the server 201 transmits, to the game system 1, list data regarding a plurality of rooms among the rooms corresponding to the arrangement data stored in the server 201. The game system 1 displays a list image indicating the list of the rooms, by using the list data from the server 201.

Figure 14:
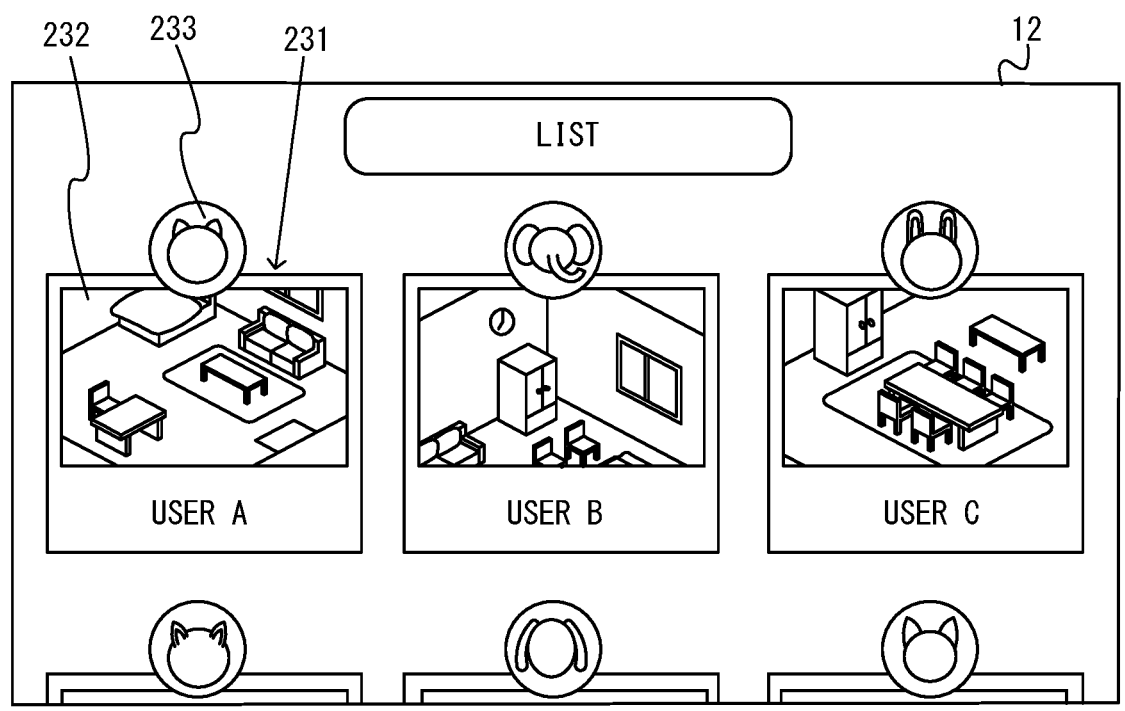
FIG. 14 shows an example of a list image.

FIG. 14 shows an example of the list image. As shown in FIG. 14, the list image includes a plurality of room images indicating the states of the rooms (e.g., a room image 231 shown in FIG. 14). In the exemplary embodiment, the list image is scrollable in the up-down direction, and the list image being scrolled allows more room images to be displayed.

In the exemplary embodiment, the room image 231 includes a thumbnail image 232 indicating arrangement in the room, and a character icon image 233 indicating the non-player character living in the room. The room image 231 further includes the name of a user who has edited the room. Each of the room images included in the list image, similar to the room image 231, includes a thumbnail image, a character icon image, and a user name. Each room image may include any information with which the corresponding room is identifiable. Each room image may include an icon image indicating the player character of the user, and a title given to the room by the user, in addition to the above images and information.

In the exemplary embodiment, when the user performs an operation input designating a room image included in the list image, the user can see the details of the room indicated by the room image. Specifically, when the operation input designating the room image is performed, the game system 1 transmits, to the server 201, a request for acquiring arrangement data regarding the room image, and receives the arrangement data from the server 201. Then, the game system 1 constructs a room in the virtual space, based on the received arrangement data, and generates and displays an image of the constructed room. At this time, the game system 1 may place the player character in the room and cause the player character to move in the room.

The game system 1 may subject the room image designated by the user to various processes in addition to (or instead of) displaying the image of the room. For example, the game system 1 may acquire, from the server 201, data regarding the design of the room of the designated room image so that the user can use the design for his/her editing. Moreover, the game system 1 may register the user of the designated room image so that, for example, the user can see arrangement data uploaded by the registered user and can transmit a message to the registered user.

In the exemplary embodiment, rooms indicated by room images to be included in the list image are selected by the server 201. That is, upon receiving the list acquisition request from the game system 1, the server 201 selects some rooms from among the rooms of the arrangement data stored therein, and transmits, to the game system 1, list data regarding the selected rooms.

In the exemplary embodiment, the server 201 performs the above-described selection by using the cumulative editing time regarding each room. The server 201 performs the selection by using the cumulative editing time indicated by the cumulative editing time data included in the arrangement data stored therein. Specifically, the server 201 calculates a selection value for each room, based on the cumulative editing time. In the exemplary embodiment, the selection value is calculated based on the cumulative editing time and also based on other elements different from the cumulative editing time (e.g., the number of placement objects arranged in the room). If the other elements are fixed, the selection value is calculated such that the shorter the cumulative editing time, the smaller the selection value is. The server 201 selects rooms to be included in the list data such that rooms, the selection values of which are smaller than a predetermined reference value, are excluded from the rooms of the arrangement data. That is, in the exemplary embodiment, arrangement data the selection values of which are smaller than the predetermined reference value are deleted from a set of the arrangement data stored in the server 201, and arrangement data of the rooms to be included in the list are selected from the set of the arrangement data after the deletion.

As described above, in the exemplary embodiment, the game system 1 transmits the arrangement data to the server 201, and receives, from the server 201, list data indicating a list of a plurality of arrangement data transmitted from other game systems to the server 201. Then, on the basis of the list data received from the server 201, the game system 1 performs list display regarding the plurality of arrangement data. Thus, the rooms edited by the other users are introduced to the user.

In the exemplary embodiment, the game system 1 performs list display regarding arrangement data (in other words, rooms indicated by the arrangement data) selected based on the editing time, out of a set of arrangement data from a plurality of other information processing apparatuses. More specifically, the game system 1 performs list display regarding a plurality of arrangement data which are obtained by deleting, from the set of the arrangement data from the plurality of other game systems, arrangement data the editing-time-based evaluations (specifically, selection values) of which are lower than the predetermined reference value. Thus, a room the cumulative editing time of which is shorter is less likely to be included in the list, and therefore, a room for which the user has taken much time and effort becomes more likely to be included in the list. Thus, the user can be provided with the list including many rooms that are helpful for the user in editing. Moreover, the user, who wants to have many other users to see the room edited by him/her, is motivated to take time and effort in editing the room.

The cumulative editing time regarding the arrangement data is used for evaluation for the list display. That is, in the exemplary embodiment, when re-editing is performed for a room, the game system 1 performs evaluation of editing on the room having been re-edited, based on a time obtained by adding the editing time of the re-editing to the editing time before the re-editing is performed (i.e., based on the cumulative editing time). This allows the game system 1 to perform the evaluation while reflecting the time and effort taken by the user for a plurality of times of editing so far.

In another embodiment, as another example of determining arrangement data to be displayed in the list display on the basis of the editing time, the game system 1 may determine, according to evaluation (i.e., selection value), the order of arrangement data (specifically, room images) to be displayed in the list display. For example, the room images corresponding to the arrangement data may be arranged such that the room image of the arrangement data having the greater selection value is displayed earlier in the order (i.e., at the more upper side in the list image). In another embodiment, as for the arrangement data (specifically, room images) to be displayed in the list display, the game system 1 may vary the display modes of the arrangement data, based on the selection values. For example, when the selection value of a room image is greater than a predetermined reference value, the game system 1 may display the room image with a mark indicating that the room image is "recommended". In the other embodiments described above, a process of deleting a part of the set of the arrangement data based on the selected values may be executed or may not be executed.

3. Specific Example of Processing in Information Processing System

Next, a specific example of information processing in the information processing system including the game system 1 and the server 201 will be described with reference to FIGS. 15 to 20.

Figure 15:
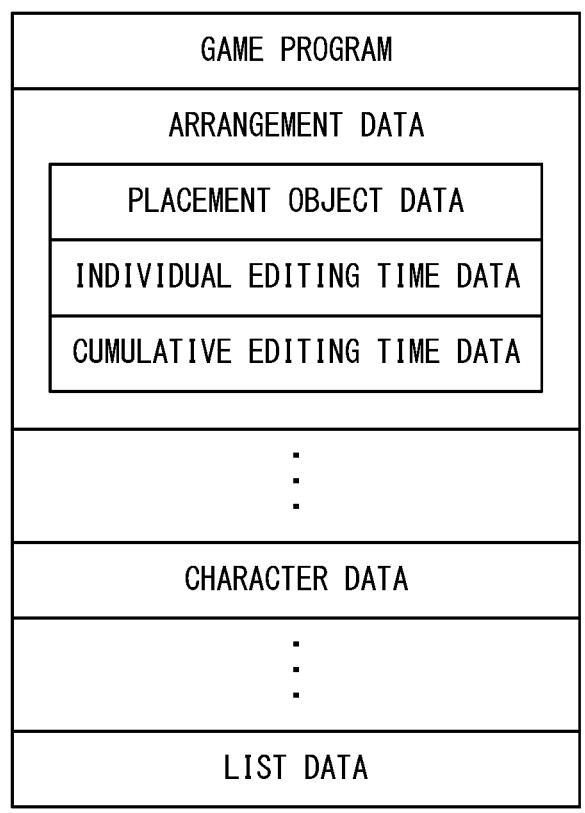
FIG. 15 shows an example of various data used for information processing in a non-limiting information processing system.

FIG. 15 shows an example of various types of data used for the information processing in the information processing system. The various types of data shown in FIG. 15 are stored in a storage medium (e.g., the flash memory 84, the DRAM 85, and/or the memory card attached to the slot 23) accessible by the main body apparatus 2.

As shown in FIG. 15, the game system 1 stores therein a game program. The game program is a program for executing the game processing (specifically, the processes shown in FIGS. 16 to 19) of the exemplary embodiment. The game system 1 further stores therein character data, arrangement data, and list data.

The arrangement data is data indicating arrangement of placement objects in an editing area (here, a room) to be edited. In the exemplary embodiment, the arrangement data includes placement object data, individual editing time data, and cumulative editing time data. The placement object data is data indicating the type, position, and direction of each placement object arranged in the room. The individual editing time data is data indicating the above-described individual editing time. If one room is subjected to a plurality of times of editing, a plurality of individual editing time data per editing may be included in the arrangement data. The cumulative editing time data is data indicating the above-described cumulative editing time. The arrangement data is stored for each room in the game space.

The character data is data regarding a non-player character associated with a room. In the exemplary embodiment, the character data includes data of a high evaluation flag. The high evaluation flag is a flag indicating whether or not a high evaluation has been made on editing of the room of the non-player character. The character data may further include, for example, data indicating a parameter that indicates ability and/or nature (including individuality) of the character, in addition to the above-described data. The character data is stored for each non-player character that appears in the game space.

The list data is data indicating rooms (in other words, arrangement data) included in a list image displayed in the game system 1. The list data includes, for example, data of identification numbers of the rooms or the arrangement data included in the list image.

In the exemplary embodiment, a part or the entirety of the respective data shown in FIG. 15 is stored on the terminal side (i.e., in the game system 1), and is also stored in the server 201. The respective data shown in FIG. 15 may be stored in either the game system 1 or the server 201. If the same data is stored in the game system 1 and the server 201, synchronization between the data stored in the game system 1 and the data stored in the server 201 is made at an appropriate timing.

The server 201 stores therein a server-side game program, in addition to the data shown in FIG. 15. The server-side game program is a program for executing game processing executed by the server 201 (i.e., a server process shown in FIG. 20). That is, when a processor of the server 201 executes the server-side game program by using a memory, the server process described later (see FIG. 20) is executed in the server 201.

Figure 16:
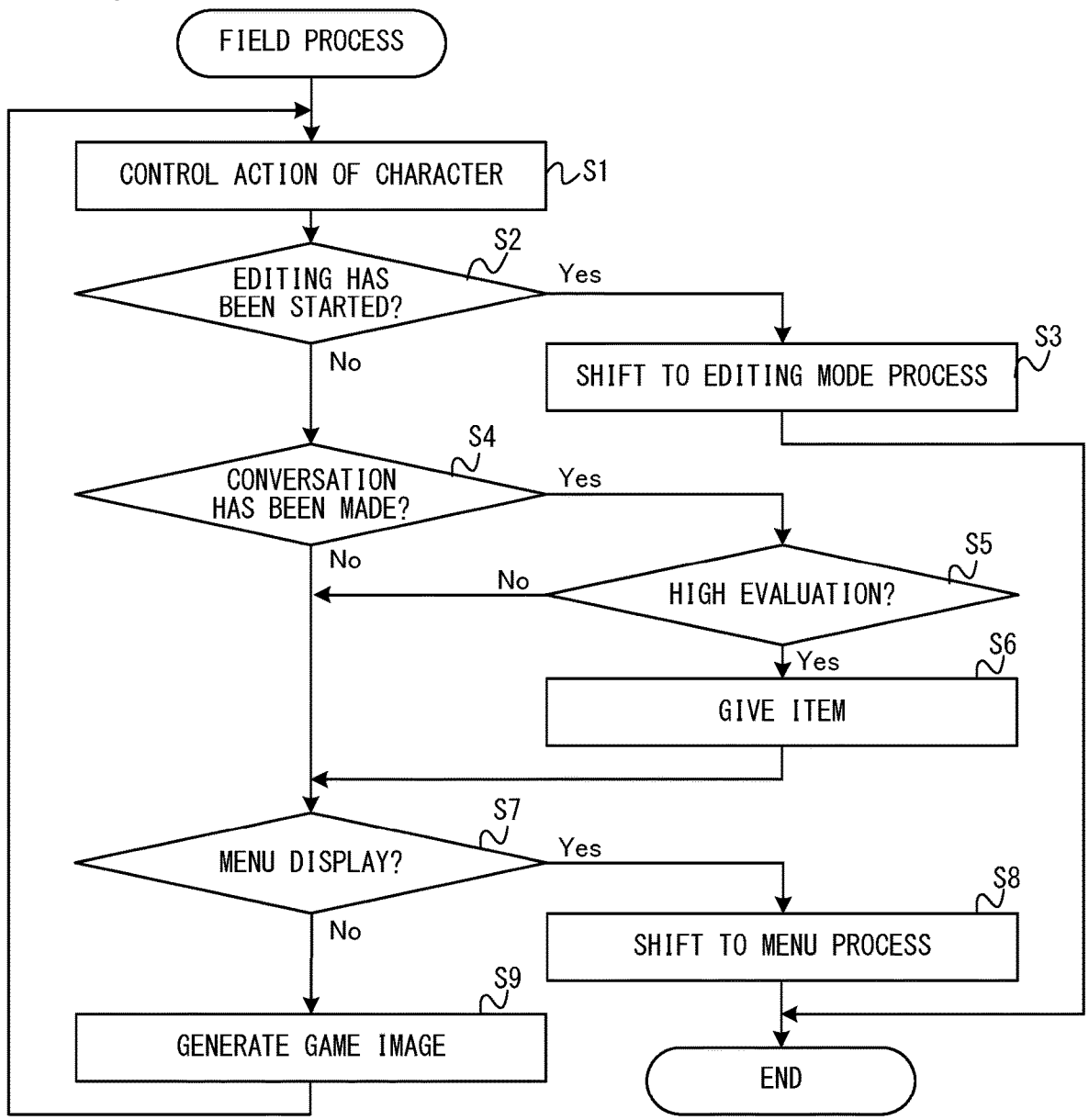
FIG. 16 is a flowchart showing an example of a flow of a field process executed by the non-limiting game system.

FIG. 16 is a flowchart showing an example of a flow of a field process executed by the game system 1. The field process shown in FIG. 16 is a process including: controlling an action of a player character or the like arranged in a game field; and displaying a game image indicating the state of the player character or the like. For example, the field process is started in accordance with that an instruction to start the game has been made by the user during execution of the game program.

In the exemplary embodiment, the processor 81 of the main body apparatus 2 executes the game program stored in the game system 1 to execute processes in steps shown in FIGS. 16 to 19. The processor of the server 201 executes the server-side game program stored in the server 201 to execute processes in steps shown in FIG. 20. However, in another embodiment, a part of the processes in the steps may be executed by a processor (e.g., a dedicated circuit or the like) other than the above processor. In addition, a part of the processes in the steps to be executed by the game system 1 may be executed by the server 201, and some of the processes in the steps to be executed by the server 201 may be executed by the game system 1. The processes in the steps shown in FIGS. 16 to 20 are merely examples, and the processing order of the steps may be changed or another process may be executed in addition to (or instead of) the processes in the steps as long as similar results can be obtained.

The processor of the game system 1 or the server 201 executes the processes in the steps shown in FIGS. 16 to 20 by using a memory (e.g., the DRAM 85). That is, the processor stores information (in other words, data) obtained in each process step, in the memory, and reads out the information from the memory when using the information for the subsequent process steps.

In step S1 shown in FIG. 16, the processor 81 controls the action of each of the characters (i.e., the player character and the non-player character) in the game space. That is, the processor 81 acquires operation data indicating an operation input performed by the user, via the controller communication section 83 and/or the terminals 17 and 21, and controls the action of the player character, based on the operation data. The processor 81 controls the action of the non-player character, based on an algorithm defined in the game program. In the exemplary embodiment, the process in step S1 is repeatedly executed once every predetermined time period (e.g., one-frame time) except for a case where a determination result in step S2 or S7 described later is negative and the field process is ended. Through a single process in step S1, the processor 81 moves the character by an amount according to the predetermined time period. Next to step S1, the process in step S2 is executed.

In step S2, the processor 81 determines whether or not to start editing of a room in the game space. In the exemplary embodiment, when the player character has received a request for room coordination from the non-player character during the game, or when the user has made an instruction to edit the above-described specific room, the processor 81 determines to start editing of the room. When the determination result in step S2 is positive, the process in step S3 is executed. When the determination result in step S2 is negative, the process in step S4 is executed.

In step S3, the processor 81 shifts the process to be executed from the field process to an editing mode process, and ends the field process. The editing mode process is a process for editing a room according to an instruction of the user, in the above-described editing mode. The editing mode process will be described later in detail (see FIG. 17).

Meanwhile, in step S4, the processor 81 determines whether or not the player character has had a conversation with the non-player character, based on the action of the player character controlled in step S2. When the determination result in step S4 is positive, the process in step S5 is executed. When the determination result in step S4 is negative, the processes in steps S5 and S6 are skipped and the process in step S7 is executed.

In step S5, as for the room of the non-player character which has had a conversation with the player character, the processor 81 determines whether or not a high evaluation was given to editing of the room performed in the past. In the exemplary embodiment, as described above, the character data regarding the non-player character includes data of a high evaluation flag indicating whether or not a high evaluation has been given to editing of the room of the non-player character. When the processor 81 has made a high evaluation with respect to editing in the editing mode process (i.e., when the individual editing time has been determined to be longer than the second threshold value), the processor 81 sets the high evaluation flag for the non-player character living in the room, to ON. The determination in step S5 is performed according to whether or not the high evaluation flag is ON. When the determination result in step S5 is positive, the process in step S6 is executed. When the determination result in step S5 is negative, the process in step S6 is skipped and the process in step S7 is executed.

In step S6, the processor 81 gives an item from the non-player character to the player character. Specifically, the processor 81 updates data indicating items possessed by the player character such that the item to be given is included in the data. Moreover, the processor 81 controls the non-player character so as to perform an action of giving the item after the conversation with the player character. Next to step S6, the process in step S7 is executed.

In step S7, the processor 81 determines whether or not an instruction to display a menu image has been made by the user. In the exemplary embodiment, if the game image of the game field is displayed in the field process, the user can make the instruction to display the menu image by performing a predetermined operation input. When the determination result in step S7 is positive, the process in step S8 is executed. When the determination result in step S7 is negative, the process in step S9 is executed.

In step S8, the processor 81 shifts the process to be executed, from the field process to a menu process, and ends the field process. The menu process is a process for receiving various types of instructions with the menu image being displayed. The menu process will be described later in detail (see FIG. 18).

In step S9, the processor 81 generates a game image and causes the display 12 to display the game image. The processor 81 generates the game image indicating the game space in which the processing result in step S1 is reflected, and displays the game image on the display 12. If a processing loop of steps S1, S2 and S4 to S7 is repeatedly executed, the process in step S9 is repeatedly executed once every predetermined time period described above. Thus, a moving image indicating a state in which the characters move in the game space, is displayed. In the exemplary embodiment, the game system 1 displays the image on the display 12. However, the image may be displayed on another display device (e.g., a monitor connected to the main body apparatus 2) different from the display 12. Next to step S9, the process in step S1 is executed again.

Although not shown in the drawings, when a condition for ending the game has been satisfied (e.g., when the user has performed an instruction to end the game) in the field process, the processor 81 ends the field process.

Figure 17:
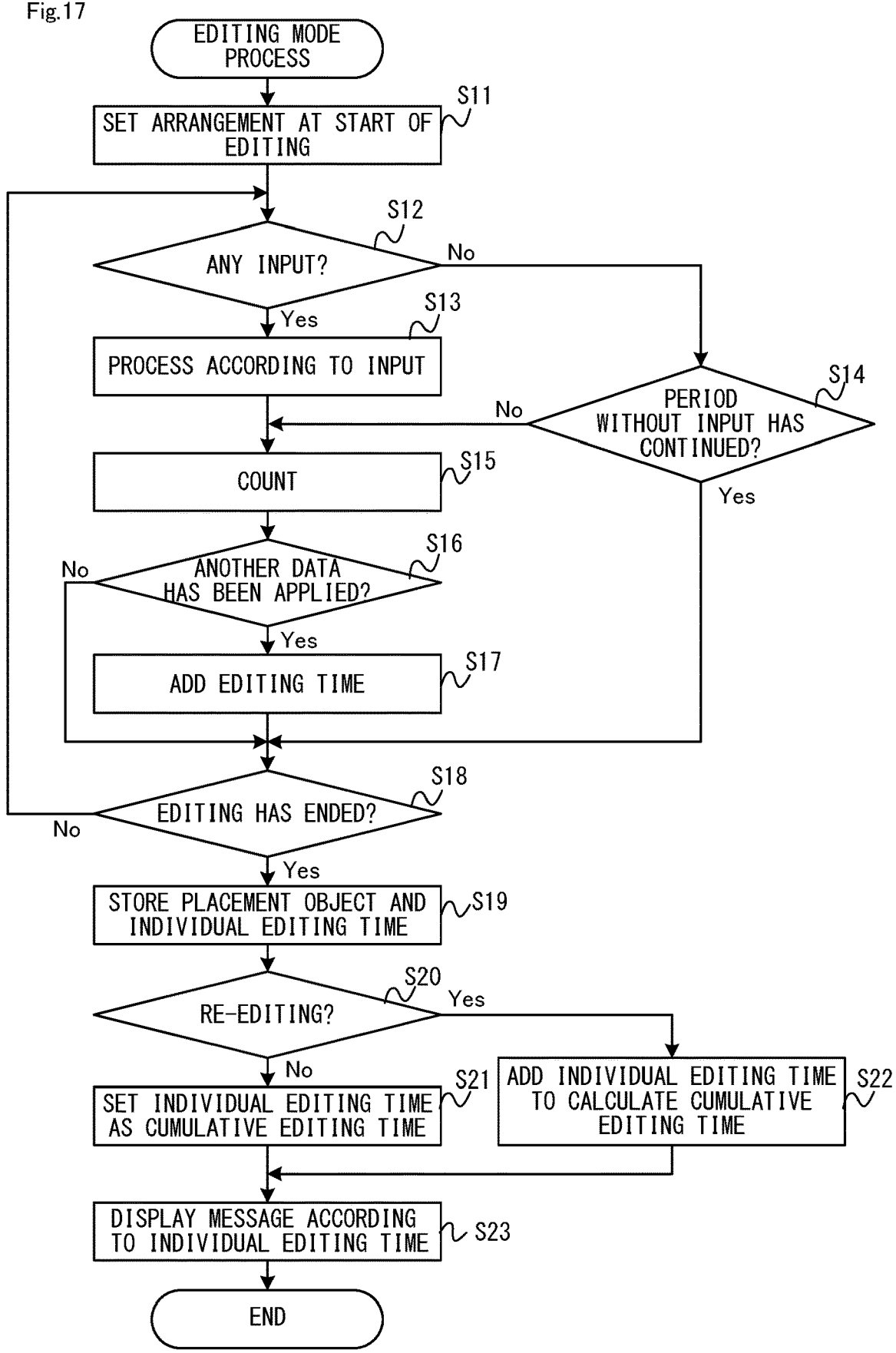
FIG. 17 is a flowchart showing an example of a flow of an editing mode process executed by the non-limiting game system.

FIG. 17 is a flowchart showing an example of a flow of the editing mode process executed by the game system 1. The editing mode process is started in accordance with that determination to shift to the editing mode process has been made in the field process (step S3).

In step S11 shown in FIG. 17, the processor 81 sets arrangement of a room at start of editing. That is, when editing to be performed in the current editing mode is re-editing, the processor 81 reads out, from the memory, arrangement data regarding the room to be edited, and sets arrangement of placement objects in the room to be edited, based on the read arrangement data. Meanwhile, when the editing to be performed in the current editing mode is not re-editing, the processor 81 sets arrangement of placement objects in the room to be edited, to initial arrangement determined in advance. Next to step S11, the process in step S12 is executed.

In step S12, the processor 81 determines whether or not an operation input by the user is performed on the game system 1. That is, the processor 81 acquires the above-described operation data via the controller communication section 83 and/or the terminals 17 and 21, and performs the determination in step S12, based on the operation data. When the determination result in step S12 is positive, the process in step S13 is executed. When the determination result in step S12 is negative, the process of step S14 described later is executed.

In step S13, the processor 81 executes a process according to the operation input received in step S12. For example, the processor 81 performs a process for editing, such as moving the cursor, designating a placement object with the cursor, or moving the designated placement object. Moreover, for example, when an instruction to apply the arrangement of the above-described specific room has been made by the user, the processor 81 reads out the arrangement data regarding the specific room, and changes the arrangement of the room being edited, based on the read arrangement data. Next to step S13, the process in step S15 described later is executed.

In step S14, the processor 81 determines whether or not a period in which there is no operation input to the game system 1 by the user has continued for a predetermined time. When the determination result in step S14 positive, the process in step S18 described later is executed. When the determination result in step S14 is negative, the process in step S15 is executed.

In step S15, the processor 81 counts an editing time. In the exemplary embodiment, a processing loop of steps S12 to S18 is executed once every predetermined time period. The processor 81 updates the value of the current individual editing time such that the predetermined time is added thereto. Next to step S15, the process in step S16 is executed.

In step S16, the processor 81 determines, based on the process executed in step S13, whether or not arrangement data of another room (i.e., the specific room) different from the room being currently edited, has been applied. When the determination result in step S16 is positive, the process in step S17 is executed. When the determination result in step S16 is negative, the process in step S17 is skipped and the process in step S18 is executed.

In step S17, the processor 81 adds the editing time regarding the applied arrangement data to the value of the individual editing time. That is, the processor 81 reads out the cumulative editing time data regarding the specific room, and adds the value indicated by the read cumulative editing time data to the individual editing time being counted. Next to step S17, the process in step S18 is executed.

In step S18, the processor 81 determines whether or not to end the editing mode. Specifically, the processor 81 determines whether or not the editing end instruction for ending the editing mode has been made by the user. When the determination result in step S18 is positive, the process in step S19 is executed. When the determination result in step S18 is negative, the process in step S12 is executed again. Thereafter, a series of processes in steps S12 to S18 is repeatedly executed until it is determined to end the editing mode in step S18.

In step S19, as for the arrangement data regarding the room having been edited, the processor 81 stores, in the memory, the placement object data and the individual editing time data. That is, the processor 81 stores, in the memory, data indicating the arrangement state of the placement objects obtained through the editing performed in step S13, as the placement object data. Moreover, the processor 81 stores, in the memory, data indicating the editing time counted during the editing mode, as the individual editing time data. Next to step S19, the process in step S20 is executed.

In step S20, the processor 81 determines whether or not the editing performed in the current editing mode is re-editing. When the determination result in step S20 is negative, the process in step S21 is executed. When the determination result in step S20 is positive, the process in step S22 is executed.

In step S21, the processor 81 stores the individual editing time obtained in step S19, as the cumulative editing time of the edited room. Specifically, the processor 81 stores, in the memory, data of the same content as the individual editing time data included in the arrangement data regarding the edited room, as the cumulative editing time data included in the arrangement data. Next to step S21, the process in step S23 is executed.

In step S22, the processor 81 stores, as the post-editing cumulative editing time, a time obtained by adding the individual editing time obtained in step S19 to the pre-editing cumulative editing time of the room having been edited. Specifically, the processor 81 stores, as new cumulative editing time data, data indicating a time obtained by adding the editing time counted in the current editing mode process, to the value indicated by the cumulative editing time data included in the arrangement data regarding the edited room (i.e., to the cumulative editing time so far). Next to step S22, the process in step S23 is executed.

In step S23, the processor 81 causes the display 12 to display a message according to the individual editing time calculated in step S17 (see FIG. 11). Specifically, the processor 81 reads out the arrangement data stored in the memory, and determines a message to be displayed, based on the individual editing time data included in the arrangement data. The processor 81 determines the content of the message according to the method described in the above "[2-1. Editing of editing area]", and displays the determined message together with the game image indicating the state in which the player character and the non-player character are arranged in the edited room. Thus, evaluation based on the editing time has been performed. When the evaluation result is high (i.e., when the individual editing time is longer than the second threshold value), the processor 81 sets the high evaluation flag for the non-player character to ON. When the evaluation result is not high, the processor 81 sets the high evaluation flag to OFF. After step S23, the processor 81 ends the editing mode process. After the editing mode process has ended, the processor 81 starts to execute the field process shown in FIG. 17.

As described above, in the exemplary embodiment, the game system 1, when performing evaluation, reads out the arrangement data stored in the memory. Then, evaluation of editing is performed based on the editing time included in the read arrangement data. The timing at which the evaluation is performed is discretionary. The evaluation may not necessarily be performed immediately after completion of the editing, and may be performed at any timing after the editing (e.g., the timing when the player character talks to the non-player character living in the edited room).

Figure 18:
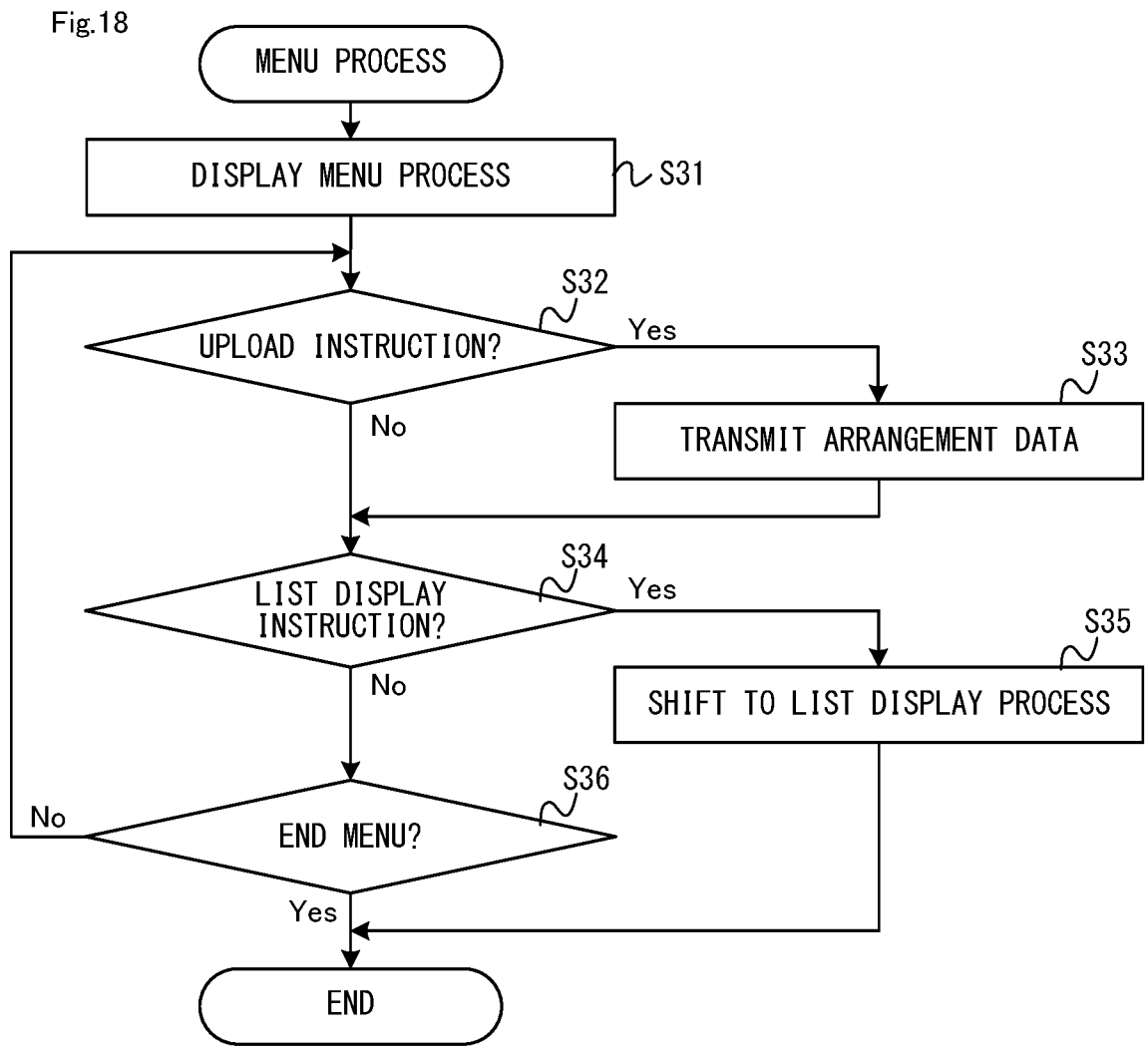
FIG. 18 is a flowchart showing an example of a flow of a menu process executed by the non-limiting game system.

FIG. 18 is a flowchart showing an example of a flow of a menu process executed by the game system 1. The menu process is started in accordance with that, in the field process, shifting to the menu process has been determined (step S8).

In step S31 shown in FIG. 18, the processor 81 causes the display 12 to display the menu image. In the exemplary embodiment, with the menu image being displayed, the processor 81 receives an upload instruction to upload the arrangement data to the server 201, and a list display instruction to perform the above-described list display. Next to step S31, the process in step S32 is executed.

In step S32, the processor 81 determines whether or not the upload instruction has been made by the user. When the determination result in step S32 is positive, the process in step S33 is executed. When the determination result in step S32 is negative, the process in step S33 is skipped and the process in step S34 is executed.

In step S33, the processor 81 transmits the arrangement data stored in the memory (i.e., the arrangement data of the room having been edited by the user during the game), to the server 201 via the network communication section 82. In the exemplary embodiment, the processor 81 associates data of user ID for identifying the user with the arrangement data, and transmits the data of user ID together with the arrangement data to the server 201. Here, the processor 81 may display the list of the arrangement data stored in the memory, receive, from the user, an instruction to select the arrangement data to be transmitted to the server 201, and transmit the arrangement data instructed by the user to the server 201. Next to step S33, the process in step S34 is executed.

In step S34, the processor 81 determines whether or not the list display instruction has been made by the user. When the determination result in step S34 is positive, the process in step S35 is executed. When the determination result in step S34 is negative, the process in step S36 is executed.

In step S35, the processor 81 shifts the process to be executed, from the menu process to the list display process, and ends the menu process. The list display process is a process for displaying the list of arrangement data regarding editing performed by other users. The list display process will be described later in detail (see FIG. 19).

In step S36, the processor 81 determines whether or not to end the menu process. Specifically, the processor 81 determines whether or not an instruction to end display of the menu image has been made. When the determination result in step S36 is negative, the process in step S32 is executed again. Thereafter, the processes in steps S32 to S36 are repeatedly executed until it is determined in step S36 to end the menu process. When the determination result in step S36 is positive, the processor 81 ends the menu process. Thereafter, the processor 81 starts to execute the field process shown in FIG. 17.

Figure 19:
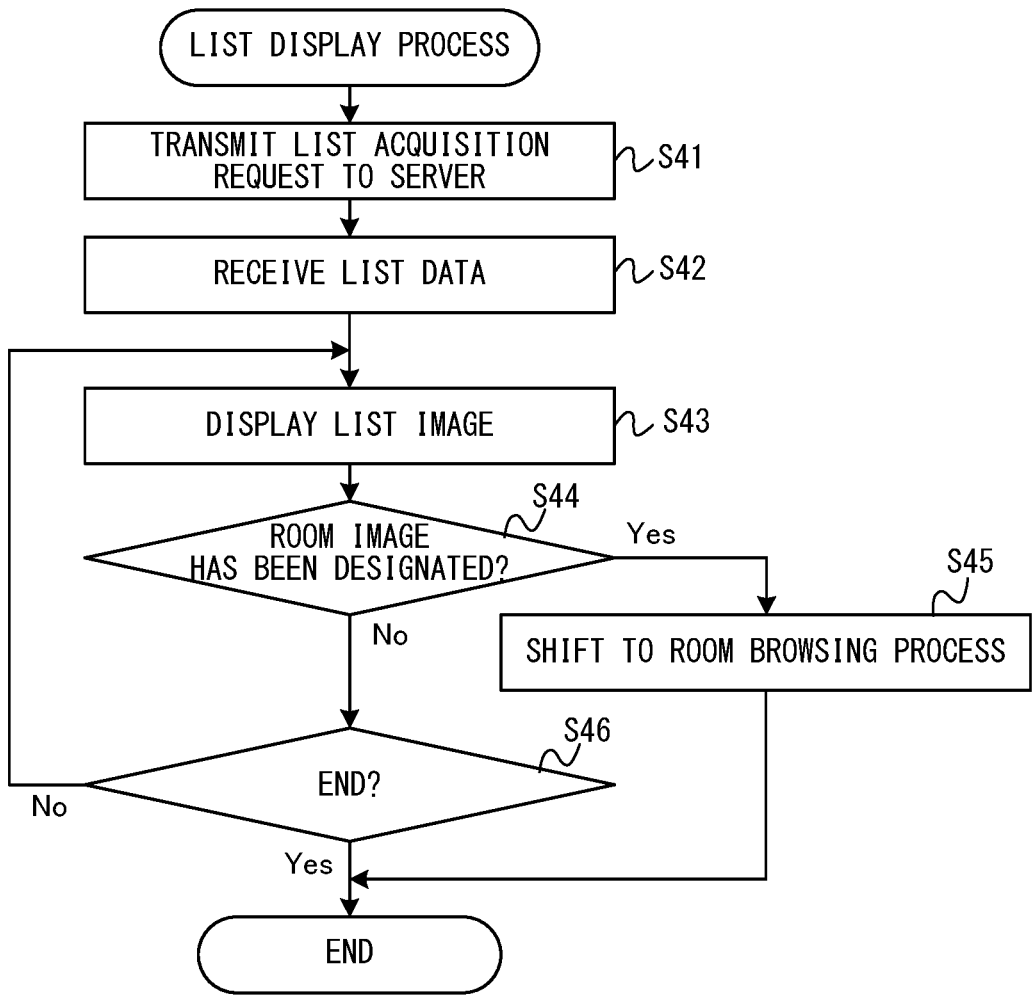
FIG. 19 is a flowchart showing an example of a flow of a list display process executed by the non-limiting game system.

FIG. 19 is a flowchart showing an example of a flow of the list display process executed by the game system 1. The list display process is started in accordance with that a list display instruction has been made in the menu process.

In step S41 shown in FIG. 19, the processor 81 transmits a list acquisition request for acquiring list data, to the server 201 via the network communication section 82. Next to step S41, the process in step S42 is executed.

In step S42, the processor 81 receives the list data from the server 201. The server 201, having received the list acquisition request from the game system 1, transmits the list data to the game system 1 (step S56 described later), and the processor 81 receives the list data via the network communication section 82. The received list data is stored in the memory. Next to step S42, the process in step S43 is executed.

In step S43, the processor 81 displays a list image on the display 12 (see FIG. 14). Here, the list data received in step S42 includes data for generating room images to be included in the list image. The processor 81 generates the list image based on the received list data, and displays the list image on the display 12. Next to step S43, the process in step S44 is executed.

In step S44, the processor 81 determines whether or not a room image included in the list image displayed on the display 12 has been designated by the user. When the determination result in step S44 is positive, the process in step S45 is executed. When the determination result in step S44 is negative, the process in step S46 is executed.

In step S45, the processor 81 shifts the process to be executed, from the list display process to a room browsing process, and ends the list display process. The room browsing process is a process for browsing the room regarding the designated room image. Although not shown in the drawings, in the room browsing process, the processor 81 transmits, to the server 201, a request for acquiring the arrangement data regarding the designated room image, and receives the arrangement data from the server 201. Then, the processor 81 constructs a room in the virtual space, based on the received arrangement data, and generates and displays an image of the constructed room.

In step S46, the processor 81 determines whether or not to end the list display. Specifically, the processor 81 determines whether or not an instruction to end the list display has been made by the user. When the determination result in step S46 is negative, the process in step S43 is executed again. Thereafter, the processes in steps S43 to S46 are repeatedly executed until it is determined in step S46 to end the list display. When the determination result in step S46 is positive, the processor 81 ends the list display process. Thereafter, the processor 81 starts to execute the menu process shown in FIG. 18.

Figure 20:
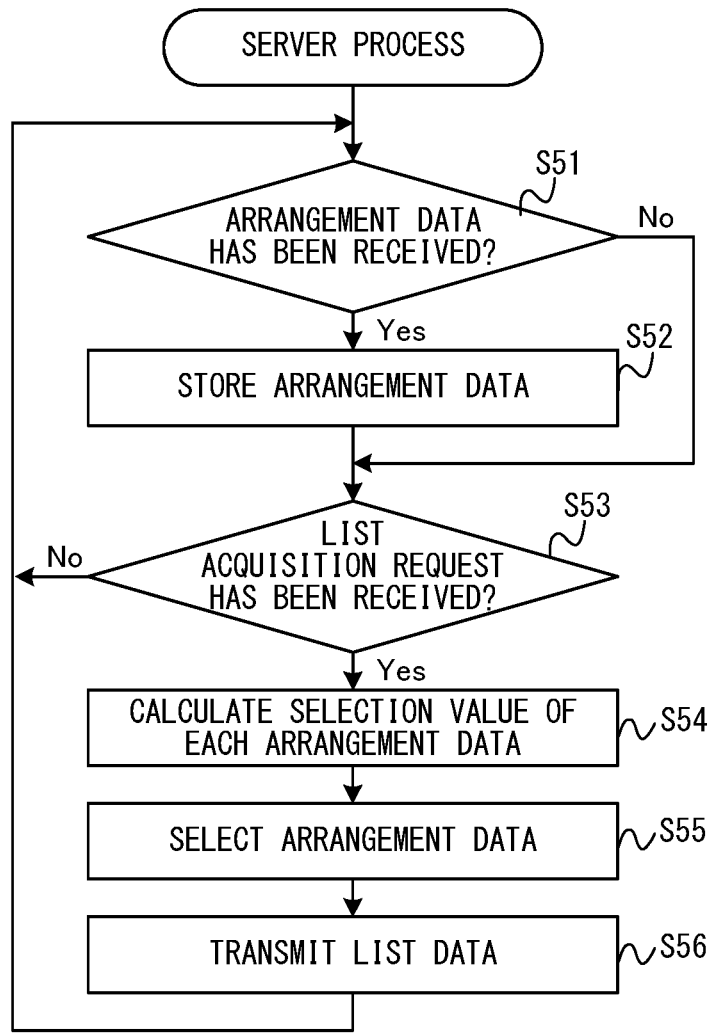
FIG. 20 shows an example of a flow of a server process executed in a non-limiting server.

FIG. 20 shows an example of a flow of a server process executed by the server 201. In the server 201, a series of processes shown in FIG. 20 is repeatedly executed so as to respond to requests from a plurality of game systems.

In step S51 shown in FIG. 20, the processor of the server 201 determines whether or not arrangement data has been received from a game system via the communication section. When the determination result in step S51 is positive, the process in step S52 is executed. When the determination result in step S51 is negative, the process in step S52 is skipped and the process in step S53 is executed.

In step S52, the processor stores the received arrangement data in the storage section. Since data of user ID is associated with the arrangement data transmitted from the game system, the processor stores the arrangement data and the data of user ID in association with each other. Next to step S52, the process in step S53 is executed.

In step S53, the processor determines whether or not the list acquisition request has been received from the game system via the communication section. When the determination result in step S53 is positive, the process in step S54 is executed. When the determination result in step S53 is negative, the processes in steps S54 to S56 are skipped and the process in step S51 is executed again.

In step S54, the processor calculates the above-described selection value for each arrangement data stored in the storage section (i.e., for the room corresponding to the arrangement data). As described in the above "[2-2. Display of list of edited rooms]", the selection value is calculated based on the cumulative editing time included in the arrangement data. Next to step S54, the process in step S55 is executed.

In step S55, the processor selects arrangement data to be included in the list, based on the selection values of the respective arrangement data. As described in the above "[2-2. Display of list of edited rooms]", from the set of the arrangement data stored in the storage section, arrangement data the selection value of which is smaller than the predetermined reference value is deleted, and arrangement data of rooms to be included in the list are selected from the set of the arrangement data after the deletion. Next to step S55, the process in step S56 is executed.

In step S56, the processor transmits list data to the game system. That is, the processor generates list data regarding the respective arrangement data selected in the step S55, and transmits the generated list data to the game system via the communication section. The list data may include information to be used for generating a list image in the game system. In the exemplary embodiment, the list data includes data of identification numbers of the arrangement data, data indicating non-player characters associated with the arrangement data, data of thumbnail images of the arrangement data, and data of user IDs associated with the arrangement data. The data of the thumbnail images may be automatically generated by the server 201 based on the arrangement data, or may be generated based on an operation input performed by the user when arrangement data is generated on the game system 1 side. Next to step S56, the process in step S51 is executed again.

4. Function and Effect of the Present Embodiment, and Modifications

As described above, in the above exemplary embodiment, the game program is configured to cause a processor of an information processing apparatus (e.g., the main body apparatus 2) to execute the following processes.

Performing, in a predetermined area (e.g., a room) in a virtual space, editing including at least one of selecting a placement object to be placed in the area, placing the placement object, and moving the placement object, on the basis of an operation input (step S13).

Counting editing time during which the editing is performed (step S17).

Storing, in a memory, arrangement data indicating arrangement of the placement object in the predetermined area (step S13).

Performing evaluation of the editing on the basis of at least the editing time such that, when the editing time is short, lower evaluation is given as compared to the case where the editing time is long (step S17).

According to the above configuration, since the editing time is reflected in evaluation, it is possible to perform evaluation in which time and effort that the user has taken for editing are reflected. Thus, evaluation regarding editing can be appropriately performed.

The above "editing time" may be either the individual editing time or the cumulative editing time in the exemplary embodiment.

In the exemplary embodiment, displaying a message according to editing time or calculating a selection value corresponds to the above-described "evaluation". However, a specific process for evaluation is discretionary and may not necessarily be the above processes. For example, the above-described process of calculating an evaluation score is an example of the "evaluation". Furthermore, for example, a process of imparting a mark indicating "recommended" to a room image in a list image according to the editing time, is also an example of the "evaluation".

In another embodiment, the information processing system may not include some of the components in the above embodiment, and may not execute some of the processes executed in the above embodiment. For example, in order to achieve a specific effect of a part of the above embodiment, the information processing system only needs to include a configuration for achieving the effect and execute a process for achieving the effect, and need not include other configurations and need not execute other processes.

The exemplary embodiment can be used as, for example, a game system and a game program, in order to, for example, appropriately performing evaluation of editing regarding arrangement of objects.

While certain example systems, methods, devices and apparatuses have been described herein, it is to be understood that the appended claims are not to be limited to the systems, methods, devices and apparatuses disclosed, but on the contrary, are intended to cover various modifications and equivalent arrangements included within the spirit and scope of the appended claims.

What is claimed is:

1. A non-transitory computer-readable storage medium having stored therein a game program that, when executed by a processor of an information processing apparatus, causes the processor to execute:
   performing, in a predetermined area in a virtual space, editing including at least one of selecting a placement object to be placed in the area, placing the placement object, and moving the placement object, on the basis of an operation input;
   counting an editing time during which the editing is performed;
   storing, in a memory, arrangement data indicating arrangement of the placement object in the predetermined area; and
   performing evaluation of the editing, based on at least the editing time such that a lower evaluation is given when the editing time is shorter than when the editing time is longer.

2. The non-transitory computer-readable storage medium according to claim 1, wherein the game program causes the processor to execute counting the editing time, based on a determination as to whether or not an input is performed in a period in which the editing is allowed.

3. The non-transitory computer-readable storage medium according to claim 1, wherein the game program further causes the processor to execute giving a reward according to the evaluation to a user who has performed the operation input.

4. The non-transitory computer-readable storage medium according to claim 1, wherein the game program further causes the processor to execute displaying a message from a non-player character in the virtual space such that the message has different contents according to the evaluation.

5. The non-transitory computer-readable storage medium according to claim 1, wherein
   the information processing apparatus is communicable with a server, and
   the game program further causes the processor to execute:
      transmitting the arrangement data to the server;
      receiving, from the server, list data indicating a list regarding a plurality of arrangement data transmitted from other information processing apparatuses different from the information processing apparatus to the server; and
      performing list display regarding the plurality of arrangement data, based on the list data received from the server.

6. The non-transitory computer-readable storage medium according to claim 5, wherein the list display relates to arrangement data that is selected based on the editing time from a set of arrangement data transmitted from a plurality of other information processing apparatuses.

7. The non-transitory computer-readable storage medium according to claim 5, wherein the list display relates to the plurality of arrangement data obtained by deleting arrangement data whose evaluation based on editing time is lower than a predetermined reference, from the set of the arrangement data transmitted from a plurality of other information processing apparatuses.

8. The non-transitory computer-readable storage medium according to claim 1, wherein
   the predetermined area is a room in the virtual space, and
   the placement object is any of a plurality of types of objects including at least furniture.

9. The non-transitory computer-readable storage medium according to claim 1, wherein
   the game program further causes the processor to execute:
      storing, in the memory, editing time data indicating the editing time such that the editing time data is included in the arrangement data;
      reading out the arrangement data stored in the memory, based on an instruction input to perform re-editing; and
      performing, based on an operation input, re-editing on arrangement of the placement object indicated by the read arrangement data, and
   evaluation of editing regarding the arrangement data on which the re-editing has been performed is performed based on a time obtained by adding an editing time of the re-editing to the editing time indicated by the editing time data included in the arrangement data before the re-editing is performed.

10. The non-transitory computer-readable storage medium according to claim 1, wherein
    the arrangement data includes editing time data indicating the editing time,
    the game program further causes the processor to execute reading out the arrangement data stored in the memory, when the evaluation is performed, and
    the evaluation is performed based on the editing time included in the read arrangement data.

11. An information processing system including a terminal device and a server communicable with the terminal device,
    the information processing system comprising at least one processor and a storage medium having stored therein a game program,
    the processor being configured to execute the game program to at least:
       perform, in a predetermined area in a virtual space, editing including at least one of selecting a placement object to be placed in the area, placing the placement object, and moving the placement object, on the basis of an operation input;
       count an editing time during which the editing is performed;
       store, in a memory, arrangement data indicating arrangement of the placement object in the predetermined area; and
       perform evaluation of the editing, based on at least the editing time such that a lower evaluation is given when the editing time is shorter than when the editing time is longer.

12. The information processing system according to claim 11, wherein the processor counts the editing time, based on a determination as to whether or not an input is performed in a period in which the editing is allowed.

13. The information processing system according to claim 11, wherein the processor gives a reward according to the evaluation to a user who has performed the operation input.

14. The information processing system according to claim 11, wherein the processor displays a message from a non-player character in the virtual space such that the message has different contents according to the evaluation.

15. The information processing system according to claim 11, wherein the processor included in the terminal device
   transmits the arrangement data to the server,
   receives, from the server, list data indicating a list regarding a plurality of arrangement data transmitted from other terminal devices different from the terminal device to the server, and
   performs list display regarding the plurality of arrangement data, based on the list data received from the server.

16. The information processing system according to claim 15, wherein the processor included in the server determines the arrangement data to be displayed in the list display, based on the editing time regarding the arrangement data.

17. The information processing system according to claim 15, wherein the processor included in the server transmits, to the terminal device, the list data regarding the plurality of arrangement data obtained by deleting arrangement data whose evaluation based on editing time is lower than a predetermined reference, from a set of arrangement data transmitted from a plurality of other terminal devices.

18. The information processing system according to claim 11, wherein
   the predetermined area is a room in the virtual space, and
   the placement object is any of a plurality of types of objects including at least furniture.

19. The information processing system according to claim 11, wherein
   the processor
   stores, in the memory, editing time data indicating the editing time such that the editing time data is included in the arrangement data,
   reads out the arrangement data stored in the memory, based on an instruction input to perform re-editing,
   performs, based on an operation input, re-editing on arrangement of the placement object indicated by the read arrangement data, and
   performs evaluation of editing regarding the arrangement data on which the re-editing has been performed is performed based on a time obtained by adding an editing time of the re-editing to the editing time indicated by the editing time data included in the arrangement data before the re-editing is performed.

20. The information processing system according to claim 11, wherein
   the arrangement data includes editing time data indicating the editing time,
   the processor reads out the arrangement data stored in the memory, when the evaluation is performed, and
   the evaluation is performed based on the editing time included in the read arrangement data.

21. An information processing apparatus including a processor,
   the processor being configured to at least:
   perform, in a predetermined area in a virtual space, editing including at least one of selecting a placement object to be placed in the area, placing the placement object, and moving the placement object, on the basis of an operation input;
   count an editing time during which the editing is performed;
   store, in a memory, arrangement data indicating arrangement of the placement object in the predetermined area; and
   perform evaluation of the editing, based on at least the editing time such that a lower evaluation is given when the editing time is shorter than when the editing time is longer.

22. The information processing apparatus according to claim 21, wherein the processor counts the editing time, based on a determination as to whether or not an input is performed in a period in which the editing is allowed.

23. The information processing apparatus according to claim 21, wherein the processor gives a reward according to the evaluation to a user who has performed the operation input.

24. The information processing apparatus according to claim 21, wherein the processor displays a message from a non-player character in the virtual space such that the message has different contents according to the evaluation.

25. The information processing apparatus according to claim 21 being communicable with a server, wherein
   the processor
   transmits the arrangement data to the server,
   receives, from the server, list data indicating a list regarding a plurality of arrangement data transmitted from other information processing apparatuses different from the information processing apparatus to the server, and
   performs list display regarding the plurality of arrangement data, based on the list data received from the server.

26. The information processing apparatus according to claim 25, wherein the processor performs the list display regarding arrangement data selected based on the editing time from a set of arrangement data transmitted from a plurality of other information processing apparatuses.

27. The information processing apparatus according to claim 25, wherein the processor performs the list display regarding the plurality of arrangement data obtained by deleting arrangement data whose evaluation based on editing time is lower than a predetermined reference, from a set of arrangement data transmitted from a plurality of other information processing apparatuses.

28. The information processing apparatus according to claim 21, wherein
   the predetermined area is a room in the virtual space, and
   the placement object is any of a plurality of types of objects including at least furniture.

29. The information processing apparatus according to claim 21, wherein
   the processor
   stores, in the memory, editing time data indicating the editing time such that the editing time data is included in the arrangement data,
   reads out the arrangement data stored in the memory, based on an instruction input to perform re-editing,
   performs, based on an operation input, re-editing on arrangement of the placement object indicated by the read arrangement data, and
   performs evaluation of editing regarding the arrangement data on which the re-editing has been performed is performed based on a time obtained by adding an editing time of the re-editing to the editing time indicated by the editing time data included in the arrangement data before the re-editing is performed.

30. The information processing apparatus according to claim 21, wherein
the arrangement data includes editing time data indicating the editing time,
the processor reads out the arrangement data stored in the memory, when the evaluation is performed, and
the evaluation is performed based on the editing time included in the read arrangement data.

31. A game processing method executed by an information processing system,
the information processing system being configured to at least:
perform, in a predetermined area in a virtual space, editing including at least one of selecting a placement object to be placed in the area, placing the placement object, and moving the placement object, on the basis of an operation input;
count an editing time during which the editing is performed;
store, in a memory, arrangement data indicating arrangement of the placement object in the predetermined area; and
perform evaluation of the editing, based on at least the editing time such that a lower evaluation is given when the editing time is shorter than when the editing time is longer.

32. The game processing method according to claim 31, wherein the information processing system counts the editing time, based on a determination as to whether or not an input is performed in a period in which the editing is allowed.

33. The game processing method according to claim 31, wherein the information processing system gives a reward according to the evaluation to a user who has performed the operation input.

34. The game processing method according to claim 31, wherein the information processing system displays a message from a non-player character in the virtual space such that the message has different contents according to the evaluation.

35. The game processing method according to claim 31, wherein
the information processing system includes an information processing apparatus, and a server communicable with the information processing apparatus, and
the information processing apparatus
transmits the arrangement data to the server,
receives, from the server, list data indicating a list regarding a plurality of arrangement data transmitted from other information processing apparatuses different from the information processing apparatus to the server, and
performs list display regarding the plurality of arrangement data, based on the list data received from the server.

36. The game processing method according to claim 35, wherein the information processing apparatus performs the list display regarding arrangement data selected based on the editing time from a set of arrangement data transmitted from a plurality of other information processing apparatuses.

37. The game processing method according to claim 35, wherein the information processing apparatus performs the list display regarding the plurality of arrangement data obtained by deleting arrangement data whose evaluation based on editing time is lower than a predetermined reference, from a set of arrangement data transmitted from a plurality of other information processing apparatuses.

38. The game processing method according to claim 31, wherein
the predetermined area is a room in the virtual space, and
the placement object is any of a plurality of types of objects including at least furniture.

39. The game processing method according to claim 31, wherein
the information processing system
stores, in the memory, editing time data indicating the editing time such that the editing time data is included in the arrangement data,
reads out the arrangement data stored in the memory, based on an instruction input to perform re-editing,
performs, based on an operation input, re-editing on arrangement of the placement object indicated by the read arrangement data, and
performs evaluation of editing regarding the arrangement data on which the re-editing has been performed is performed based on a time obtained by adding an editing time of the re-editing to the editing time indicated by the editing time data included in the arrangement data before the re-editing is performed.

40. The game processing method according to claim 31, wherein
the arrangement data includes editing time data indicating the editing time,
the information processing system reads out the arrangement data stored in the memory, when the evaluation is performed, and
the evaluation is performed based on the editing time included in the read arrangement data.

\* \* \* \* \*